United States Patent [19]
Gunning et al.

[11] Patent Number: 5,667,287
[45] Date of Patent: Sep. 16, 1997

[54] MULTI-MEDIA STORAGE SYSTEM HAVING A MULTI-COMPONENT INSERT ASSEMBLY

[76] Inventors: John D. Gunning, 55 Pharr Rd., Apt. D204; Matthew B. Rexrode, 2660 Peachtree Rd., NW., Unit #39D, both of Atlanta, Ga. 30305

[21] Appl. No.: 426,939

[22] Filed: Apr. 21, 1995

[51] Int. Cl.$^6$ .................................................. A47B 47/06
[52] U.S. Cl. ..................... 312/108; 312/111; 312/259; 312/9.3; 312/260; 312/348.2; 312/334.6
[58] Field of Search .................... 312/348.1, 334.6, 312/348.2, 334.14, 261, 260, 111, 9.3, 9.41, 9.43, 9.47, 259, 108

[56] References Cited

U.S. PATENT DOCUMENTS

| | | | |
|---|---|---|---|
| D. 277,816 | 3/1985 | Kleinert et al. | D6/446 |
| D. 287,554 | 1/1987 | Radtke | D6/446 |
| D. 291,633 | 9/1987 | Merzon | D6/446 |
| D. 321,999 | 12/1991 | Hasuike | D6/446 |
| 394,377 | 12/1888 | Kiefer | 312/317 |
| 2,200,319 | 5/1940 | Zalkind | 312/334.19 X |
| 2,227,892 | 1/1941 | Soldan | 312/107 |
| 2,451,012 | 10/1948 | Zalkind | 312/108 |
| 2,667,392 | 1/1954 | Sexton | 311/103 |
| 3,003,839 | 10/1961 | Bloom et al. | 312/111 |
| 3,031,125 | 4/1962 | Felton | 312/111 |
| 3,203,744 | 8/1965 | Batke | 312/111 |
| 3,446,544 | 5/1969 | Serwer | 312/111 |
| 3,552,579 | 1/1971 | Simon et al. | 312/111 X |
| 3,716,284 | 2/1973 | Vogt | 312/334.19 X |
| 3,751,127 | 8/1973 | Black et al. | 312/111 |
| 3,909,078 | 9/1975 | Riley | 308/3.6 |
| 3,964,809 | 6/1976 | Wirbilowicz et al. | 312/108 X |
| 4,401,350 | 8/1983 | Fortune | 312/111 X |
| 4,501,456 | 2/1985 | Schafer | 312/273 |
| 4,512,480 | 4/1985 | Evenson | 211/11 |
| 4,544,213 | 10/1985 | Long et al. | 312/183 |
| 4,624,509 | 11/1986 | Ramsey | 312/234.5 |
| 4,634,193 | 1/1987 | Liu | 312/107 |
| 4,745,775 | 5/1988 | Bussan et al. | 62/382 |
| 4,856,855 | 8/1989 | Hasuike | 312/11 |
| 5,016,946 | 5/1991 | Reznikov et al. | 312/108 |

FOREIGN PATENT DOCUMENTS

| | | | |
|---|---|---|---|
| 1381424 | 11/1964 | France | 312/111 |
| 318158 | 2/1957 | Switzerland | 312/111 |

OTHER PUBLICATIONS

Global © 1987 p. 44; Storage Cabinet #104830 top left center on page (Des. Lib. Box C–44).
Pp. 9–17, 21 & 23 From Perma Products Magazine – 1993.
Pp. 15–18, 20 From Misco Magazine – 1994 Fall Computer Products Catalog.

*Primary Examiner*—Peter M. Cuomo
*Assistant Examiner*—David E. Allred
*Attorney, Agent, or Firm*—Isaf, Vaughan & Kerr; Louis T. Isaf

[57] ABSTRACT

A multi-media storage container assembled from electrically non-conducting materials and including an elongated rectilinear outer sleeve, or case, that defines a cavity in which a partitionable insert assembly, or drawer, resides to receive and securely store different types and sizes of computer data media in a dust-free, static-free environment. A plurality of columnar supports are located within the cavity and adjacent side panels to enhance the structural rigidity of the outer sleeve. The columnar supports extend through the outer sleeve to enable interconnection of the columnar supports of a first outer sleeve to those of, at least, a second outer sleeve, thereby enabling the creation of virtually, continuous column supports to enhance the stackability of storage containers. A plurality of tracks releasably couples to the columnar supports to provide a smooth sliding surface for the insert assembly. Additionally, the insert assembly comprises a base and a wall subassembly which work in conjunction to form a media reservoir for receipt of different types of media. The multi-media storage container further includes a face plate coupled to the insert to function as a front for the outer sleeve, while providing a user with an acid for inserting or removing the insert from the cavity.

9 Claims, 23 Drawing Sheets

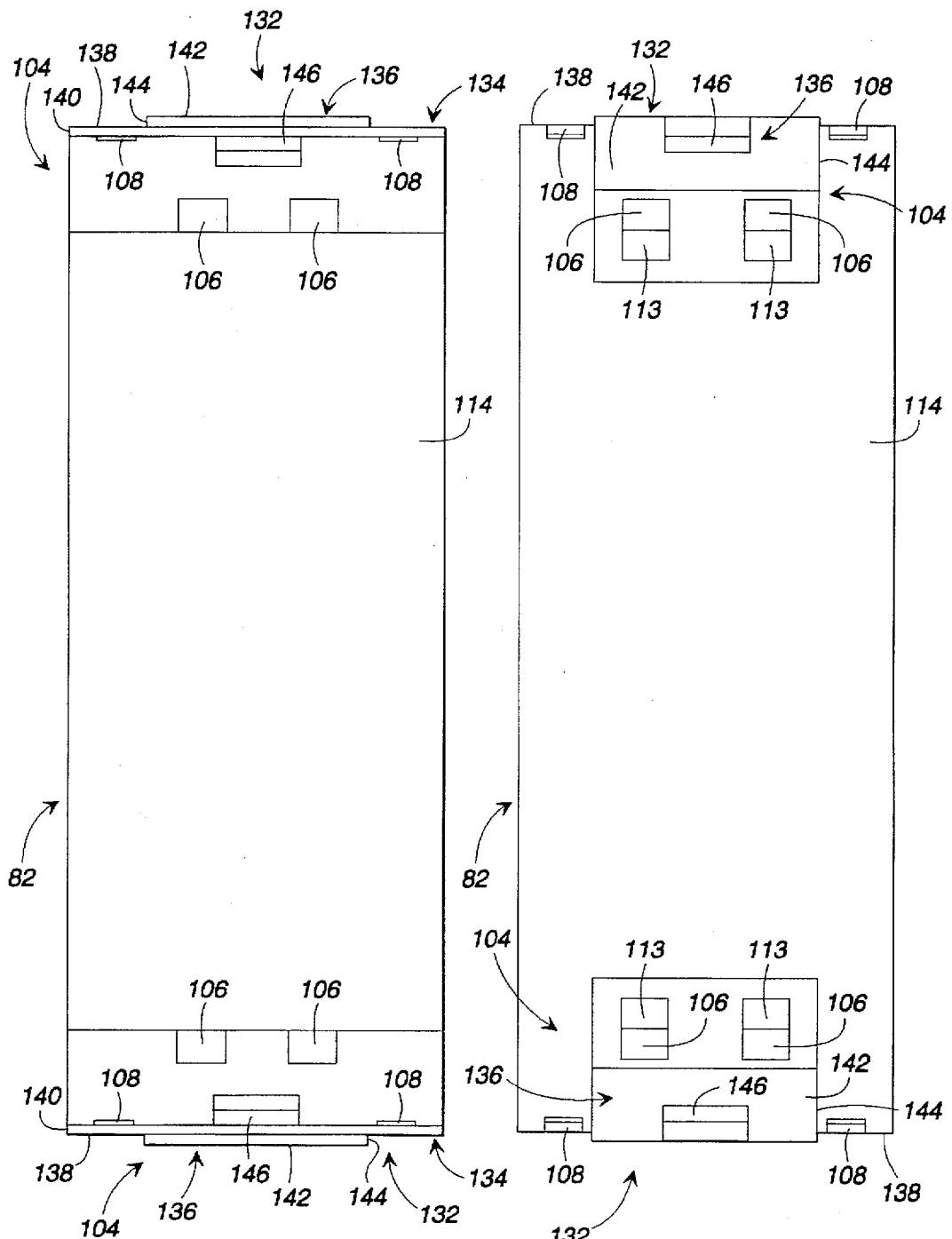

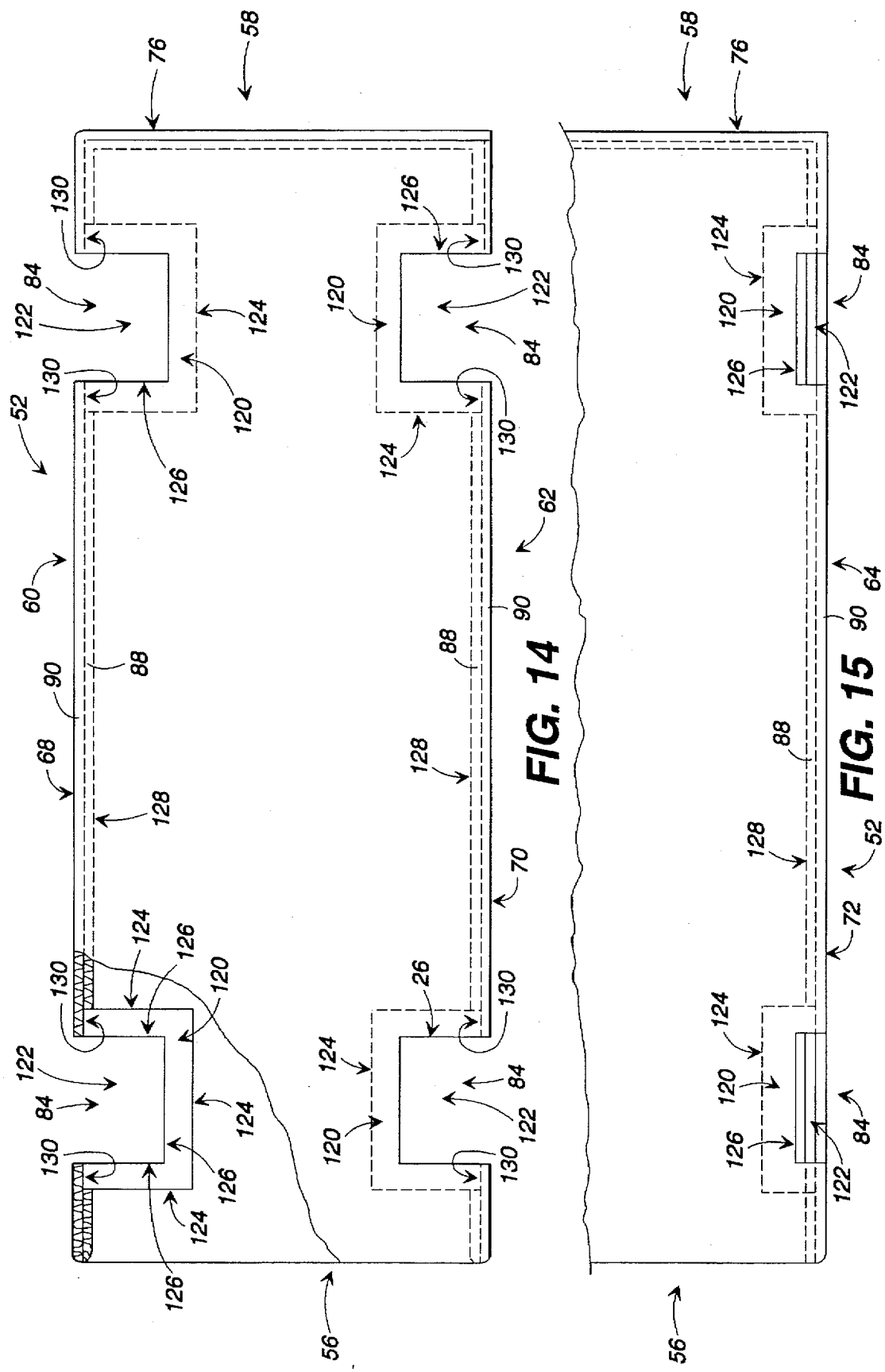

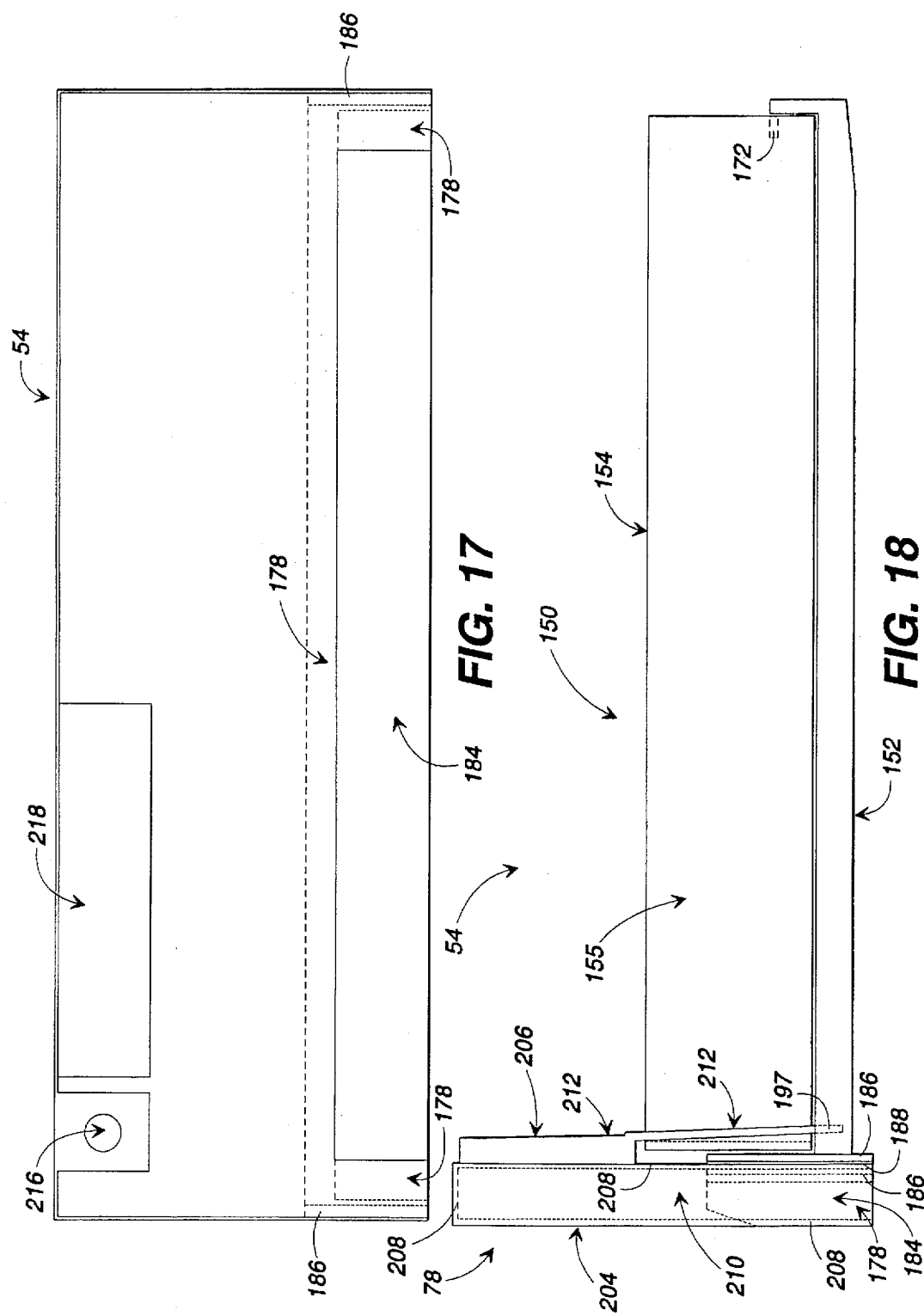

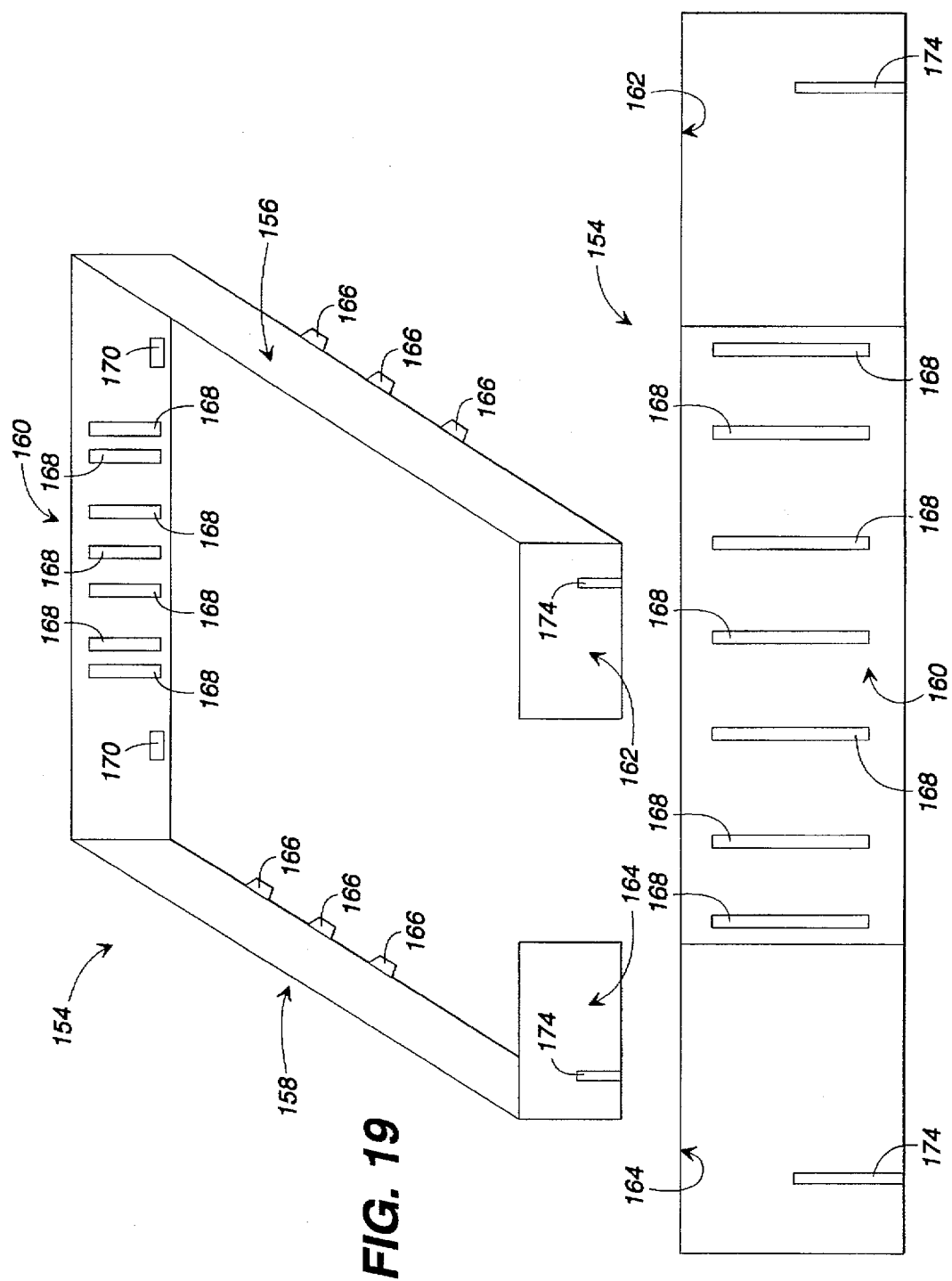

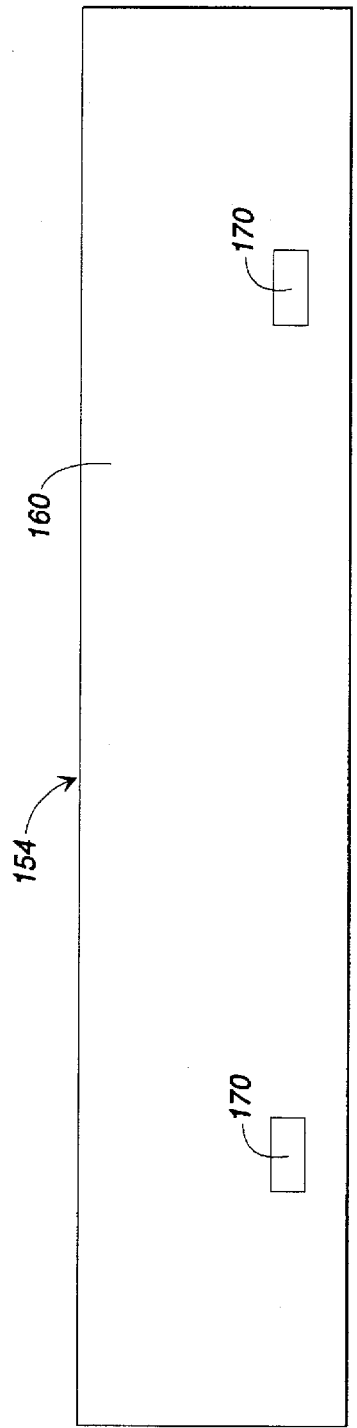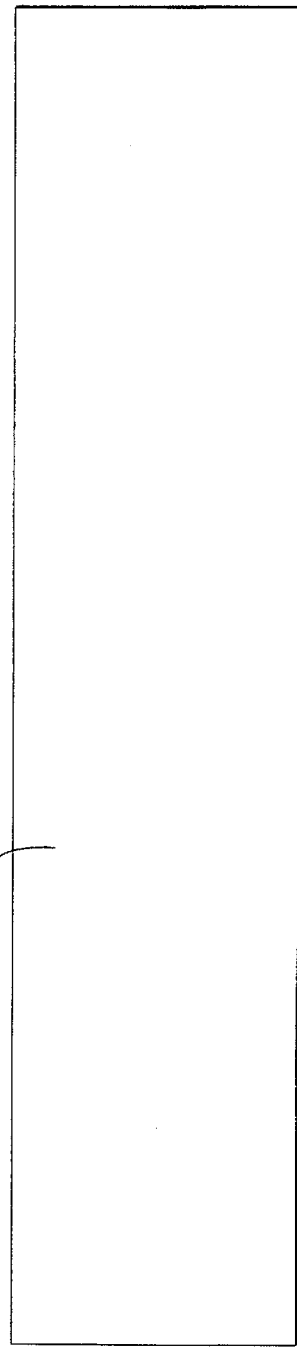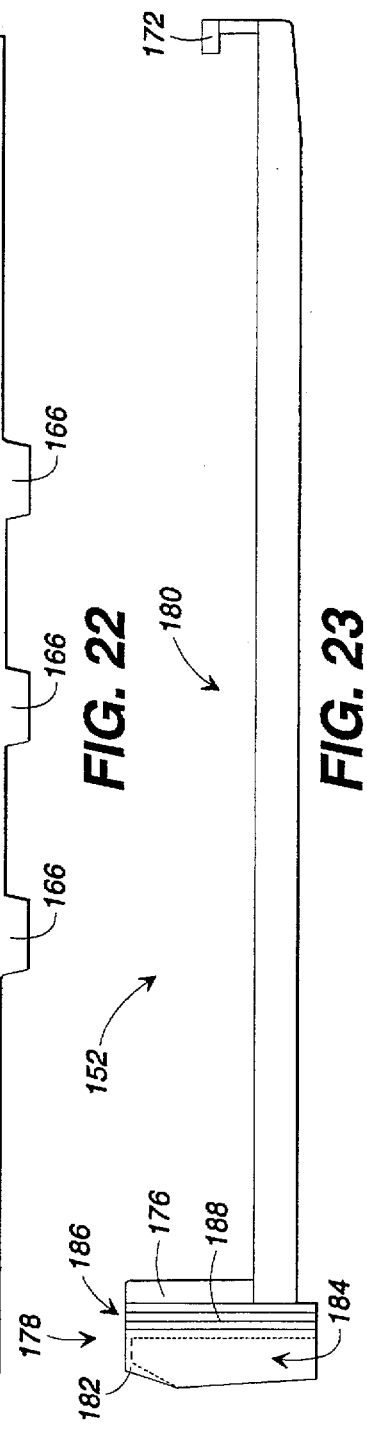

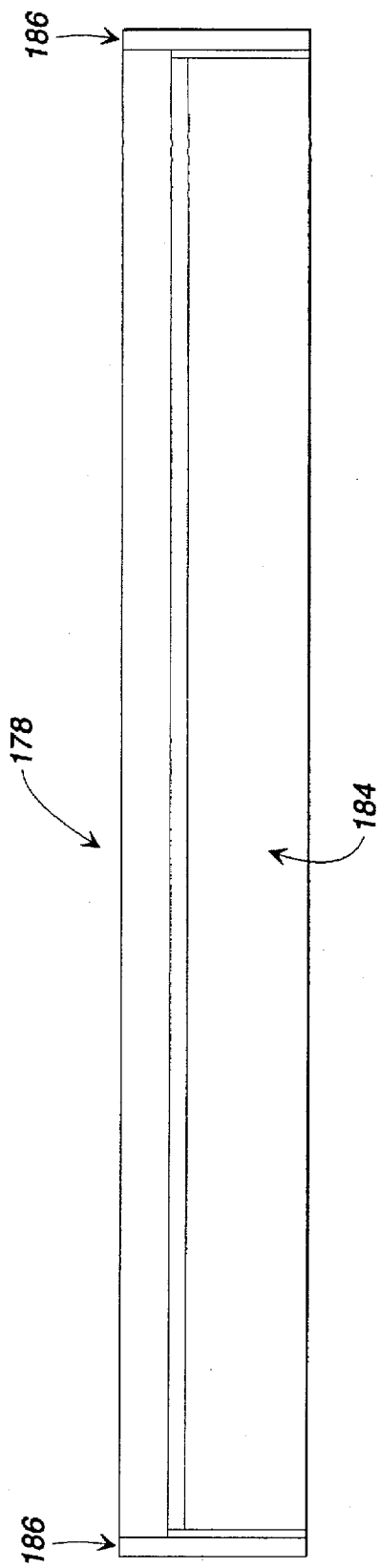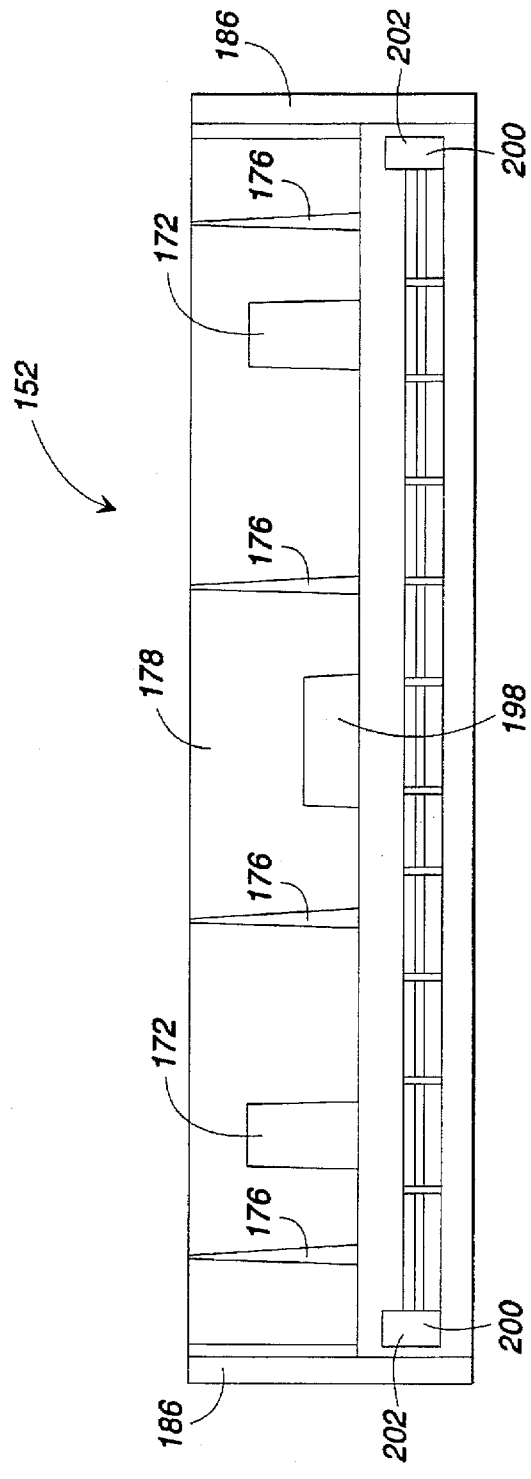

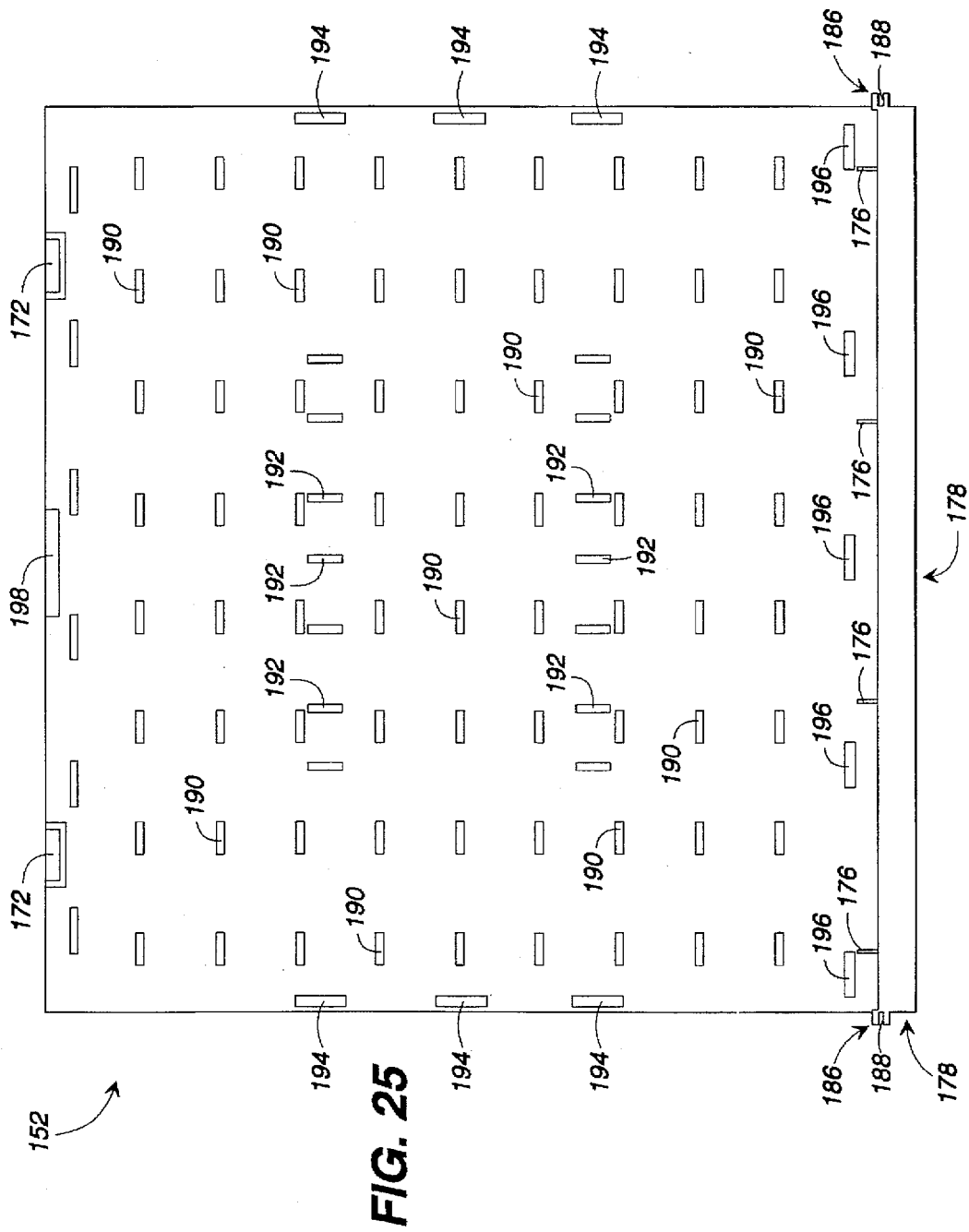

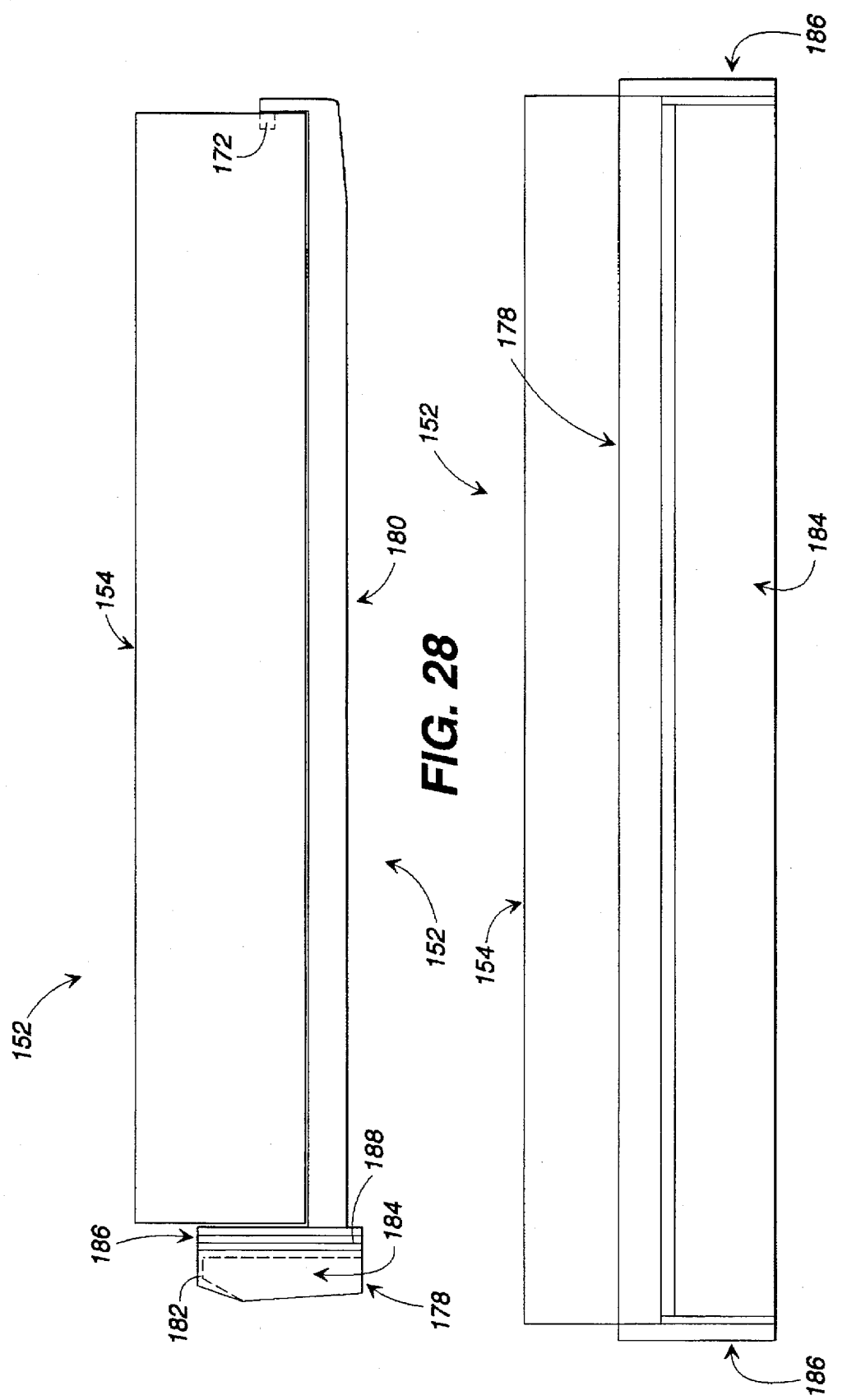

MULTI-MEDIA STORAGE SYSTEM HAVING A MULTI-COMPONENT INSERT ASSEMBLY

BACKGROUND OF THE INVENTION

The present invention relates generally to the field of stackable, storage containers and, in its most preferred embodiments, to the field of apparatus and methods for storing computer data media (or other articles) in stackable containers that reduce exposure of the media to dust and static electricity.

In the not to distant past, eight-inch floppy disks and large magnetic tape reels were the primary media for storage of computer data for a limited base of installed electronic computer equipment. Today, those media are no longer the primary media of choice for data storage. Instead, media based upon the same basic magnetic technologies have been enhanced to hold more data in a smaller form factor. Thus, the eight-inch floppy disk has been replaced by five and a quarter-inch floppy disks and three and a half-inch floppy disks, while the large magnetic tape reel has been replaced by smaller tape cartridges including 3480 cartridges, 8 mm back-up tape cartridges, and streamer tape cartridges. In addition, a number of new technologies have spawned a variety of media types in various form factors such as CD-ROMS, writable CD's, laser optical disks, floptical disks, removable hard disks, heli-scan tape cartridges, and others.

With the advent of smaller computers and the proliferation of new media, the electronic media suppliers have created consumer demand for media organization and storage that is expandable, allows for mixed media organization, easy access, some level of security and a system that provides for static electricity-free archival storage of original program media, as well as dated information that has been purged from their systems, but must be retained for future potential reference. Few existing media storage systems meet these requirements. Of the systems that meet the above requirements, most are available in plastic only and must be shipped from the manufacturer in a fully-assembled state. By the nature of their design, they create a considerable cube size and, as a result, consume a considerable amount of space during shipping, warehousing, and when displayed on store shelves.

There is, therefore, a need in the industry for a stackable apparatus that provides adaptable storage for different types and sizes of computer data media, while requiring less space than existing apparatus during warehousing, shipping, and store display. The present invention meets these needs and solves other related and unrelated problems.

SUMMARY OF THE INVENTION

Briefly described, the present invention includes a self-supporting, user-assembled, stackable multi-media storage container that enables the dust-free, static-free storage of different types and sizes of computer data media (or, for that matter, any other articles such as documents, photographs, etc.). More particularly, the multi-media storage container includes an outer sleeve that interfaces with internal structural components to enhance the stackability of the containers. The multi-media storage container further includes a uniquely designed, removable insert assembly that resides within the outer sleeve to hold media in a variably-partitionable, media reservoir. The insert assembly works in conjunction with tracks which couple to the internal structural components and enable easy insertion and removal of the insert assembly. The insert assembly includes a face plate, comprising a front for the container, that couples to the insert to provide, among other things, a means for sliding the insert assembly into or out of the storage container.

In accordance with the preferred embodiment of the present invention, the multi-media storage container includes an outer sleeve, or case, assembled, preferably, from corrugated cardboard panels die cut and folded from a cleverly arranged pattern to produce an outer sleeve having interior and exterior panels adjacent to one another (i.e., in effect, creating an outer sleeve with two-ply walls). The resulting outer sleeve defines a cavity (open at the front of the outer sleeve) in which columnar supports are placed adjacent to the side panels of the outer sleeve to greatly enhance its vertical crush resistance. A web portion of each columnar support is located within the cavity, while mating portions at the ends of each columnar support interact with opposing support interaction portions of the outer sleeve that include specially designed apertures which are die cut and strategically positioned along the edges formed where the side panels abut the top and bottom panels of the outer sleeve. The specially designed apertures include interior apertures that extend only through the interior panels and exterior apertures that extend through the interior, as well as the exterior panels. The exterior apertures are made smaller than the interior apertures to enable a smaller exterior face of a columnar support mating portion to extend through both panels and lie flush with the exterior surfaces of the exterior panels of the outer sleeve. Because each exterior face includes an interconnection clip receptacle, multiple storage containers may be stacked (or arranged in an array of storage containers) and linked together by inserting clips into the appropriate interconnection clip receptacles, thereby creating a stack of storage containers with continuous, virtual, internal columnar supports that extend the entire height of the stack to enhance structural rigidity. Also, while the smaller exterior face of each columnar support mating portion extends through both apertures, a larger interior face is trapped against the interior surfaces of the exterior panels to transfer vertical structural loads from the top panels to the columnar supports while maintaining the columnar support in position.

The columnar supports on each side of the outer sleeve are coupled together by a track which rests adjacent to the bottom panel and side panel within the cavity formed by the outer sleeve panels. Each track extends from a point near the front of the outer sleeve to a point near the back of the outer sleeve and includes a lateral portion upon which the insert assembly slides. The lateral portion has a stop which resides within a runner channel defined by the insert assembly and prevents the insert assembly from being accidentily removed from the outer sleeve. Each track also includes an upright portion which having a guide that limits upward movement of the insert assembly while sliding into or out of the outer sleeve. In addition, each track includes a plurality of pins received by the columnar supports, thereby securing the track to a pair of columnar supports.

The multi-media storage container further includes an inventively designed insert assembly comprising a base and a wall subassembly. In accordance with the preferred embodiment, the base is manufactured from injection-molded plastic and has a front portion and a rear portion. The front portion is cleverly designed to reside within a face plate which forms the front of an assembled multi-media storage container. The front portion includes a pair of channels, one extending from each side of the front portion to receive a wall of the face plate. The front portion also includes a plurality of ribs extending rearward for interconnection with the wall subassembly. The rear portion of the base is substantially planar and has a plurality of retaining hooks which extend upward from the base and through openings defined by a back panel of the wall subassembly. A stop also extends upward from the base to rest against the back panel and inhibit rearward movement of the wall subassembly. The rear portion further includes a first plurality of slots for receipt of tabs of media dividers, a second plurality of slots for receipt of media supports, and a third plurality of slots for receipt of tabs extending downward from right and left panels of the wall subassembly. Additionally, the rear portion has a plurality of runner channels (also referred to herein as a runners), visible when looking at a bottom view of the base, which are integrally incorporated into the base for receipt of a track stop.

In accordance with the preferred embodiment of the present invention, the wall subassembly, like the outer sleeve, is assembled from corrugated cardboard panels die cut and folded from a cleverly arranged pattern. The wall subassembly resides atop a rear portion of the base and together, form a media reservoir for receipt of different types of media. The wall subassembly is partially secured by the plurality of retaining hooks and ribs of the base interacting with the openings and slits, respectively, of the wall subassembly. In accordance with the present invention, the face plate defines a cavity for receipt of the front portion of the base and has walls which reside within gaps defined by the channels extending from each side of the base. An interface portion extends from the back of the face plate and extends downward over the front panels of the wall subassembly. A plurality of fingers extend downward from the interface portion into slots defined by the base, thereby enclosing the front panels and completing the securing of the wall subassembly to the base.

In an alternate embodiment of the present invention, the multi-media storage container includes an outer sleeve which defines a cavity for receipt of multiple insert assemblies. The outer sleeve receives columnar supports and tracks in a substantially similar manner to that of the preferred embodiment. Vertically aligned columnar supports are clipped together through use of the clip receptacles located in the mating portions of the columnar supports which extend through aperatures defined by the outer sleeve.

Accordingly, it is an object of the present invention to store different types and sizes of computer data media.

Another object of the present invention is to prevent dust or static electricity from damaging or rendering unusable data retained by stored computer data media.

Still another object of the present invention is to store computer data media in stackable and interconnectable storage containers.

Still another object of the present invention is to store computer data media in stackable and interconnectable storage containers which receive more than one insert capable of holding computer data media.

Still another object of the present invention is to inexpensively store computer data media.

Still another object of the present invention is to enhance the structural rigidity of an inexpensive multi-media storage container.

Still another object of the present invention is to enable stacking of storage containers by a consumer without requiring the consumer to additionally purchase a separate metal rack or other means to support the storage containers in the stacked configuration.

Still another object of the present invention is to reduce the volume of space required to ship, warehouse, and display multi-media storage containers.

Still another object of the present invention is to securely store computer data media.

Other objects, features, and advantages of the present invention will become apparent upon reading and understanding the present specification when taken in conjunction with the appended drawings.

BRIEF DESCRIPTION OF THE DRAWINGS

FIG. 10 is a front, elevational view of a columnar support in accordance with the preferred embodiment of the present invention.

FIG. 11 is a back, elevational view of the columnar support of FIG. 10.

FIG. 14 is a partially cut-away, right side, elevational view of the outer sleeve of the multi-media storage container of FIG. 1.

FIG. 15 is a partial, top view of the outer sleeve of the multi-media storage container of FIG. 1.

FIG. 17 is a front elevational view of a fully assembled insert assembly in accordance with the preferred embodiment of the present invention.

FIG. 18 is a right side, elevational view of the insert assembly of FIG. 17.

FIG. 19 is a top, perspective view of a wall subassembly in accordance with the preferred embodiment of the present invention.

FIG. 20 is a front, elevational view of the wall subassembly of FIG. 19.

FIG. 21 is a back, elevational view of the wall subassembly of FIG. 19.

FIG. 22 is a right side, elevational view of the wall subassembly of FIG. 19.

FIG. 23 is a right side, elevational view of a base of an insert assembly in accordance with the preferred embodiment of the present invention.

FIG. 24 is a front, elevational view of the base of FIG. 23.

FIG. 25 is a top view of the base of FIG. 23.

FIG. 26 is a back, elevational view of the base of FIG. 23.

FIG. 28 is a right side, elevational view of a partially assembled insert assembly showing the base and wall subassembly in accordance with the preferred embodiment of the present invention.

FIG. 29 is a front elevational view of the partially assembled insert assembly of FIG. 28.

DETAILED DESCRIPTION OF THE PREFERRED EMBODIMENT

Figure 1:
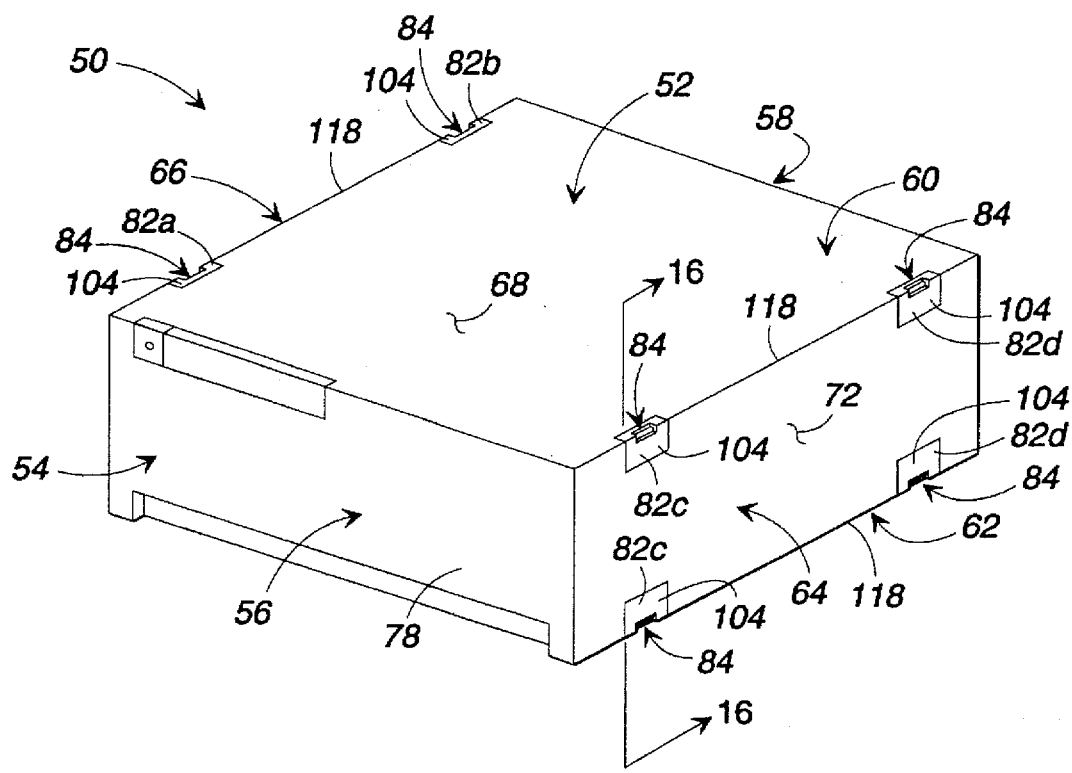
FIG. 1 is a side, perspective view of a multi-media storage container in accordance with the preferred embodiment of the present invention.
Figure 36:
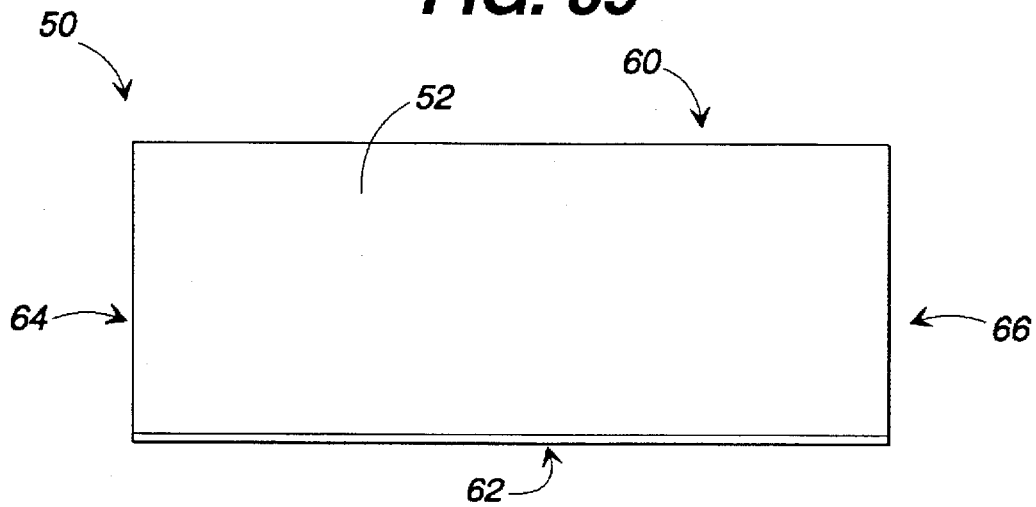
FIG. 36 is a back, elevational view of the multi-media storage container of FIG. 1.
Figure 37:
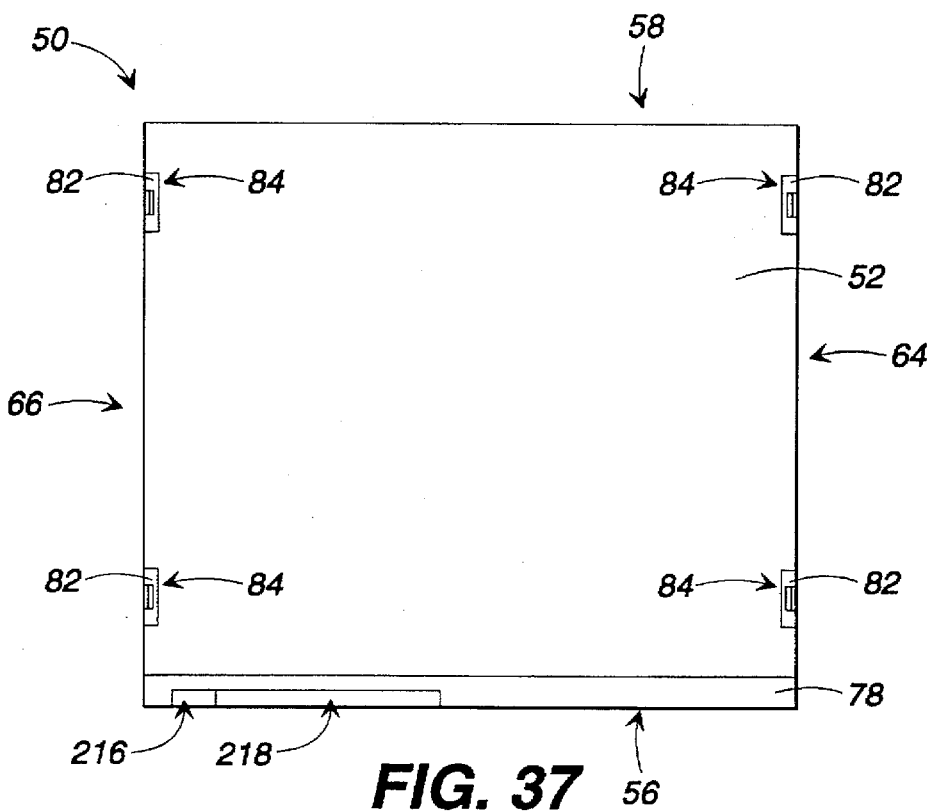
FIG. 37 is a top view of the multi-media storage container of FIG. 1.
Figure 38:
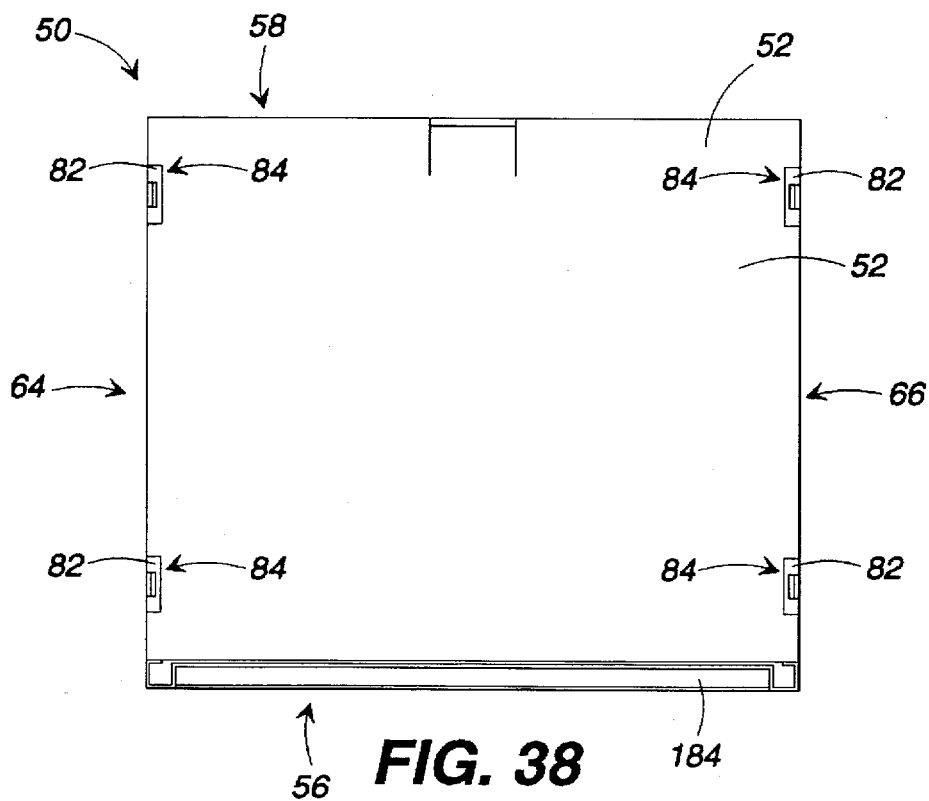
FIG. 38 is a bottom view of the multi-media storage container of FIG. 1.

Referring now in greater detail to the drawings, in which like numerals represent like components throughout the several views, the side perspective view of FIG. 1 displays a multi-media storage container 50 of the present invention in a fully-assembled and fully-closed state. In accordance with a preferred embodiment, the multi-media storage container 50 includes an outer sleeve 52 (also referred to herein as a "case") which receives an insert assembly 54 (also referred to herein as a "drawer"). The multi-media storage container 50 has, generally, an elongated rectilinear shape with a front 56, back 58, top 60, bottom 62, right side 64, and, left side 66. The outer sleeve 52 is manufactured, preferably, from two-plys of corrugated cardboard and has a top panel 68, bottom panel 70 (see FIG. 38), right side panel 72, left side panel 74, and back panel 76 (See FIG. 36). As seen in FIG. 1, the insert assembly 54 includes a face plate 78 which forms the front 56 of the multi-media storage container 50.

Figure 2:
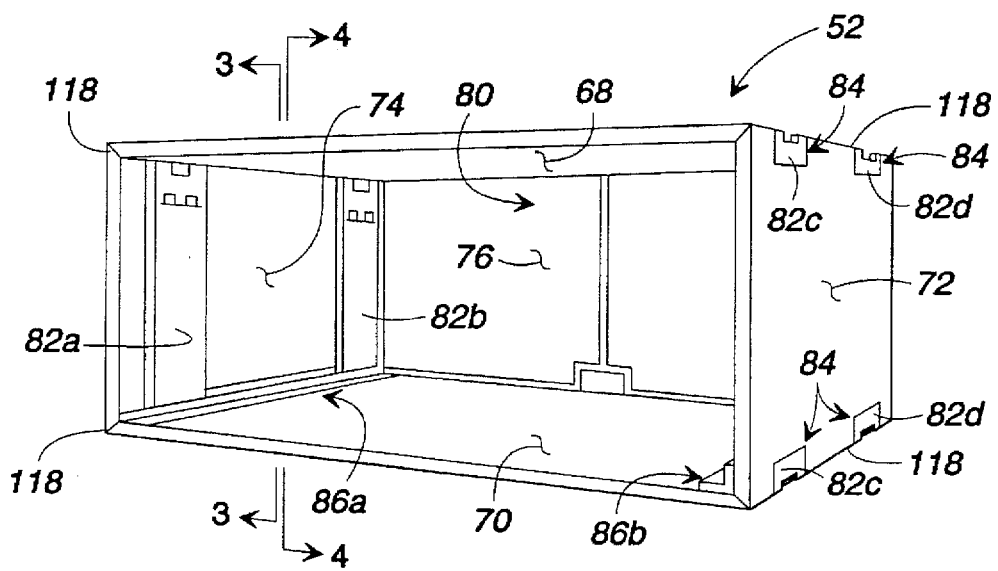
FIG. 2 is a front, perspective view of the outer sleeve of the multi-media storage container of FIG. 1.
Figure 3:
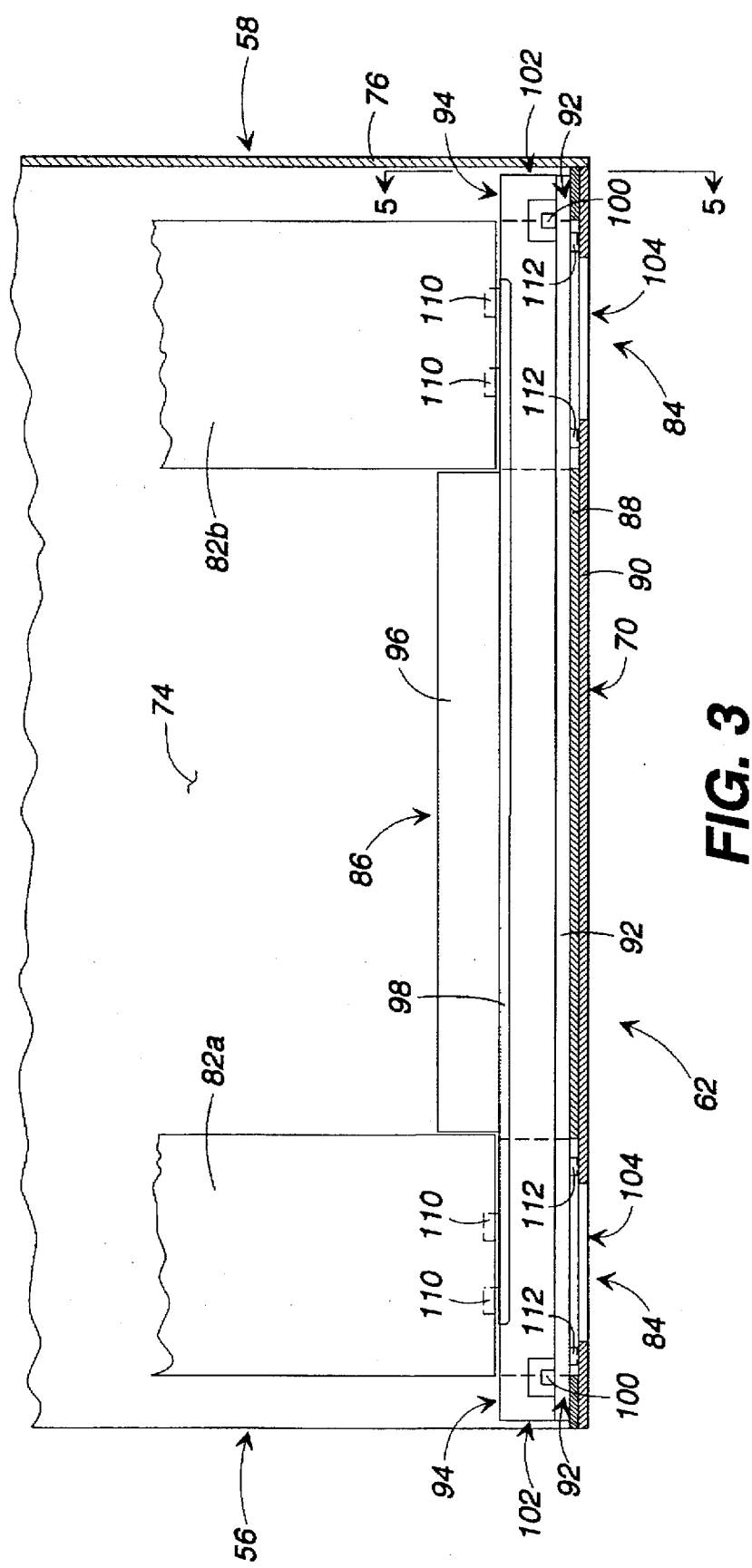
FIG. 3 is a partial sectional view of the outer sleeve of the multi-media storage container taken along line 3—3 of FIG. 2 looking toward the left side of the multi-media storage container from a location immediately adjacent to the mating portions of the columnar supports.

Panels 68,70,72,74,76 of the outer sleeve 52 define a cavity 80, as illustrated in FIG. 2, for receipt of the insert assembly 54. A first pair of columnar supports 82a,b, shown schematically, rest adjacent to the left side panel 74, within the cavity 80, and extend between the top panel 68 and the bottom panel 70. A second pair of substantially similar columnar supports 82c,d rest adjacent to the right side panel 64, within the cavity 80, and extend between the top panel 68 and the bottom panel 70. The second pair of columnar supports 82c,d is seen extending through aperatures 84 located in the top, bottom, and right side panels 68,70,72. While not visible in FIG. 2, the first pair of columnar supports 82a,b extend through aperatures 84 in the top, bottom, and left side panels, 68,70,74. A first track 86a lies atop the bottom panel 70, in the preferred embodiment, and abuts the left side panel 74. The first track 86a extends from a point near the front 56 of the outer sleeve 52 and extends rearward toward the back panel 76. The first track 86a is removably coupled to each of the columnar supports 82a,b and aids in securing the columnar supports 82a,b in position. A second track 86b, substantially similar to first track 86a, lies atop the bottom panel 70, in the preferred embodiment, and abuts the right side panel 72. Like the first track 86a, the second track 86b extends from a point near the front 56 of the outer sleeve 52 and extends rearward toward the back panel 76. The second track 86b is removably coupled to each of the columnar supports 82c,d and aids in securing the columnar supports 82c,d in position. During use of the multi-media storage container 50, the tracks 86 guide the insert assembly 54 as it is inserted and removed from the cavity 80.

Figures 7, 8, 9, 12:
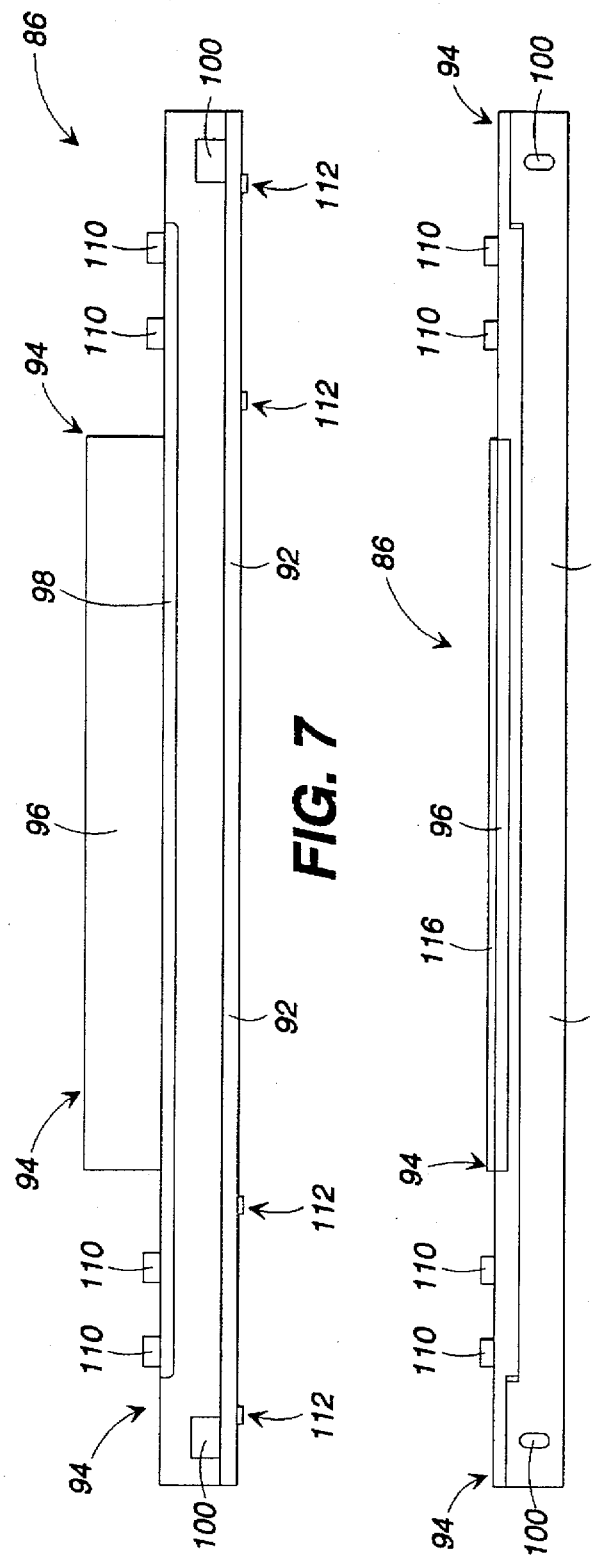
FIG. 7 is a front, elevational view of a track in accordance with the preferred embodiment of the present invention.
FIG. 8 is a top view of the track of FIG. 7.
FIG. 9 is an end, elevational view of the track of FIG. 7.
FIG. 12 is a top view of the columnar support of FIG. 10.

The interaction of the columnar supports 82a,b and track 86a are seen more clearly in FIGS. 3, 4, 5, and 6. For convenience, please refer to FIGS. 7,8, and 9 for detailed views of the track 86 and to FIGS. 10,11,12, and 13 for detailed views of each columnar support 82. Note that the interaction of the columnar supports 82c,d and track 86b is substantially similar to that of columnar supports 82a,b and track 86a and therefore, the discussion below applies equally to columnar supports 82c,d and track 86b.In accordance with the preferred embodiment, the bottom panel 70 includes an inner ply 88 and an outer ply 90. The track 86 is seen resting atop of the inner ply 88 and comprises a lateral portion 92 and an upright portion 94. The lateral portion 92 rests adjacent to the inner ply 88, while the upright portion 94 abuts a side panel, in FIG. 3, the left side panel 74. The upright portion 94 has a riser 96 which extends upward between the columnar supports 82 to aid in preventing side-to-side wobble of the columnar supports 82. The riser 96 also rests against the left side panel 74. The track 86 also comprises a guide 98 which protrudes from the upright portion 94 into the cavity 80 above the lateral portion 92. The guide 98 aids in limiting upward movement of the insert assembly 54 when it is inserted into the outer sleeve 52. The track 86 further includes stops 100 protruding upward from the lateral portion 92 near ends 102. The stops 100 aid to prevent the insert assembly 54 from being removed from the cavity 80 accidently.

Figure 4:
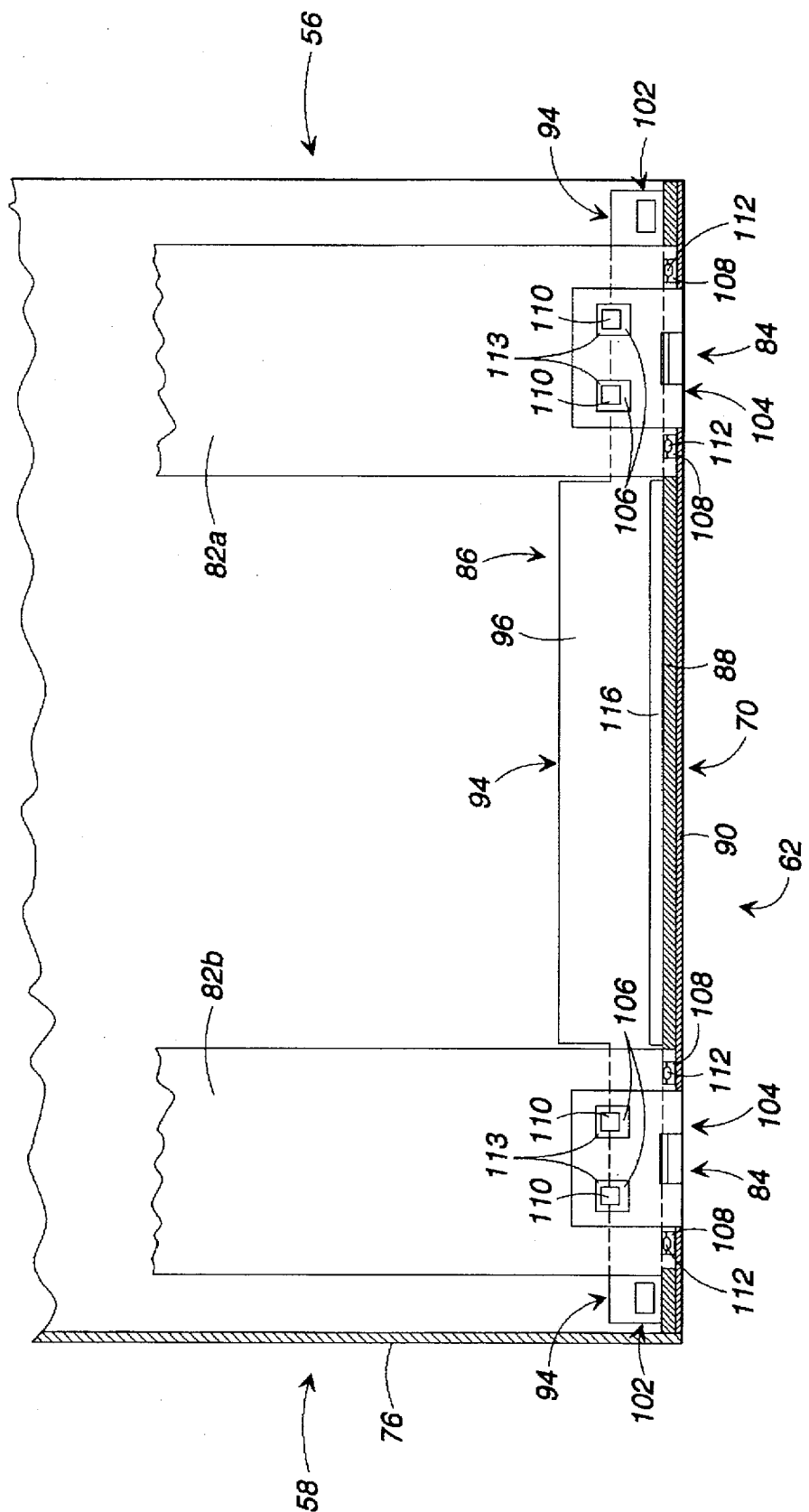
FIG. 4 is partial sectional view of the outer sleeve of the multi-media storage container taken along line 4—4 of FIG. 2 looking toward the right side of the multi-media storage container from a location immediately adjacent the inner surface of the left side panel.
Figure 5:
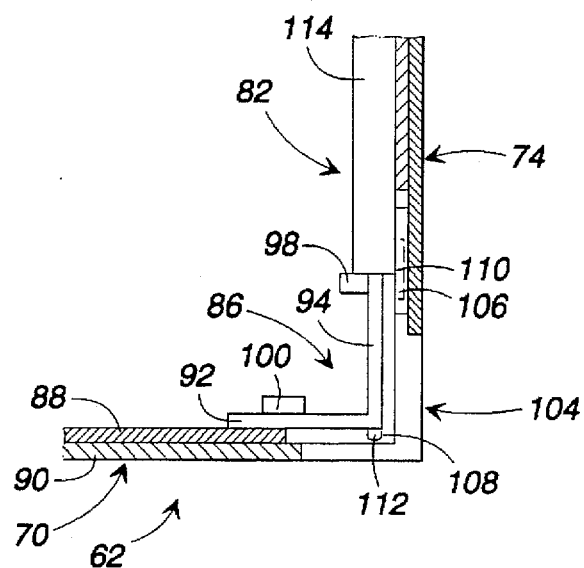
FIG. 5 is a partial sectional view of the outer sleeve of the multi-media storage container taken along line 5—5 of FIG. 3.
Figure 6:
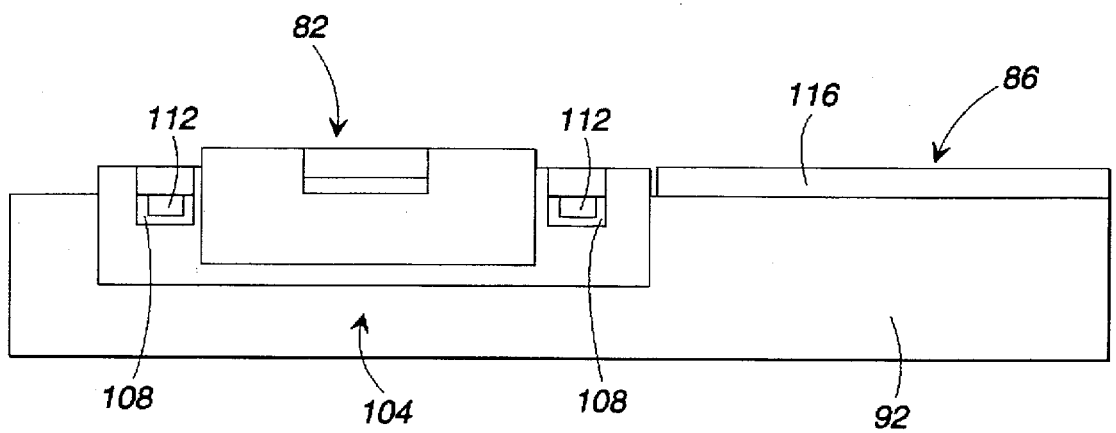
FIG. 6 a bottom view of a columnar support of FIG. 4.

Mating portions 104 of the columnar supports 82 extend below (see also FIG. 5) and adjacent to the lateral portion 92 of the track 86 as the mating portions 104 reside within the aperatures 84. As seen best in FIG. 4, the columnar supports 82 define holes 106,108 which receive pins 110,112 extending from the upright and lateral portions 94,92, respectively, of the track 86. The pins 110 extend through holes 106 and rest against shoulders 113 of the columnar supports 82. The interaction between the pins 110,112 and the holes 106,108 aids in securing the columnar supports 82 to the track 86. A web portion 114 of the columnar supports 82 abuts the upright portion 94 of the track 86 (see FIG. 5), thereby further limiting any upward movement of the track 86. As shown in FIG. 4, the track 86 also includes a spacer 116 which protrudes from the upright portion 94 and rests adjacent to the left side panel 74. The spacer 116 extends between the columnar supports 82 to limit relative motion between the columnar supports 82.

Referring back to FIG. 1, the aperatures 84 of the outer sleeve 52 receive the mating portions 104 of the columnar supports 82. As shown by the aperatures 84 visible in FIGS. 1 and 2, each aperature 84 is located along an edge 118 defined by the top and bottom panels 68,70 abutting the right and left side panels 72,74. Similar aperatures 84 are present along each edge 118. A portion of each aperature 84 extends into each panel 68,70,72,74. In accordance with the preferred embodiment and as illustrated in the cut away portion of the right side view of FIG. 14 and the partial top view of FIG. 15, the outer sleeve 52 comprises, preferably, an interior ply 88 and an exterior ply 90 of corrugated cardboard, while each aperature 84 comprises an interior aperature 120 aligned with an exterior aperature 122. The interior aperature 120 extends through the interior ply 88 of corrugated cardboard and defines an interior aperature edge 124 extending around its perimeter. The exterior aperature 122 extends through the exterior ply 90 of corrugated cardboard and defines an exterior aperature edge 126 extending around its perimeter. Because the interior aperature 120 is larger than the exterior aperature 122, the interior surface 128 of the outer ply 90 is exposed to the cavity 80 and forms an aperature face 130 around the exterior aperature 122.

Figure 13:
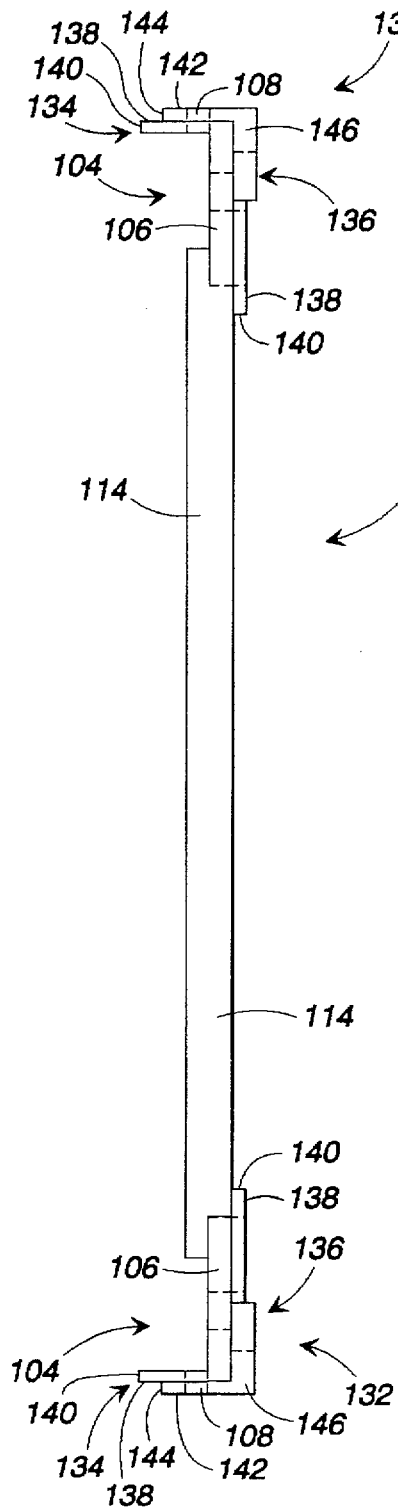
FIG. 13 is a side, elevational view of the columnar support of FIG. 10.

In accordance with the preferred embodiment, a single columnar support 82 has two mating portions 104, one at each end 132, and occupies two vertically-opposed aperatures 84. To properly interface with the vertically-opposed aperatures 84 and their interior and exterior aperatures 120,122, the mating portions 104 are positioned symmetrically at the ends 132 of each columnar support 82 with each mating portion 104 having an interior mating portion 134 and an exterior mating portion 136 as shown in FIGS. 10–13. The mating portions 74, including the interior and exterior mating portions 134,136, as seen in the side view of FIG. 13, are, generally, shaped to follow the contour of the outer sleeve 52 and aperatures 84. The mating portions 104 are joined by the elongated web member 114.

Figure 41:
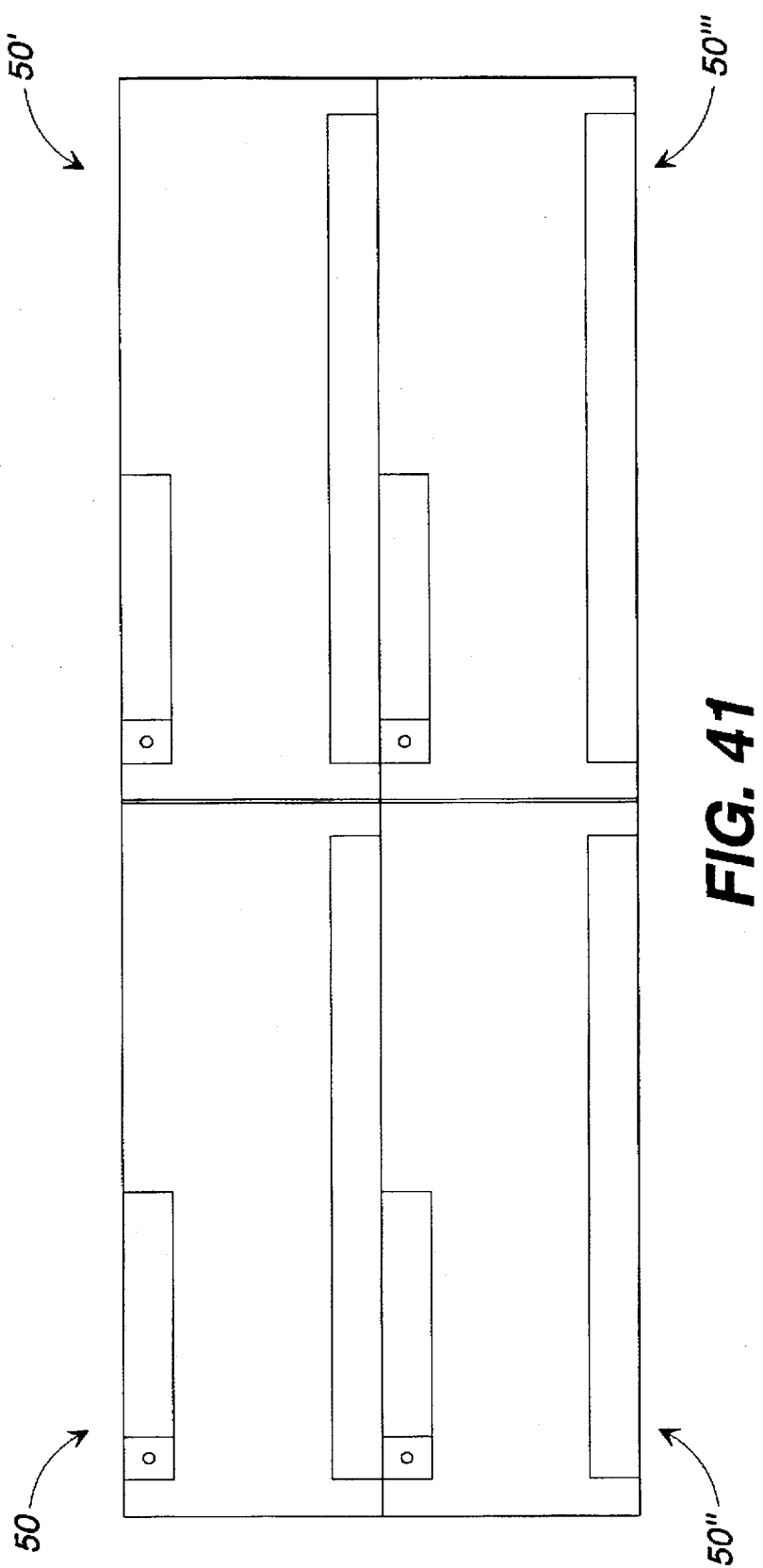
FIG. 41 is a side, perspective view of a plurality of multi-media storage containers joined in an array of multi-media storage containers.

Each interior mating portion 134 of a columnar support 82 has an interior mating face 138 and defines an interior mating shoulder 140 around its periphery. Similar to the interior mating portion 134, the exterior mating portion 136 has an exterior mating face 142 and defines an exterior mating shoulder 144 around its periphery. The exterior mating face 142 also defines an interconnection clip receptacle 146 for receiving a clip (not shown) that enables interconnection of the multi-media storage container 50 to, at least, a second multi-media storage container 50' (see FIG. 41). As shown by the hidden lines in side view of FIG. 13, the interconnection clip receptacle 146 extends through the interior and exterior mating portions 134.

Figure 16:
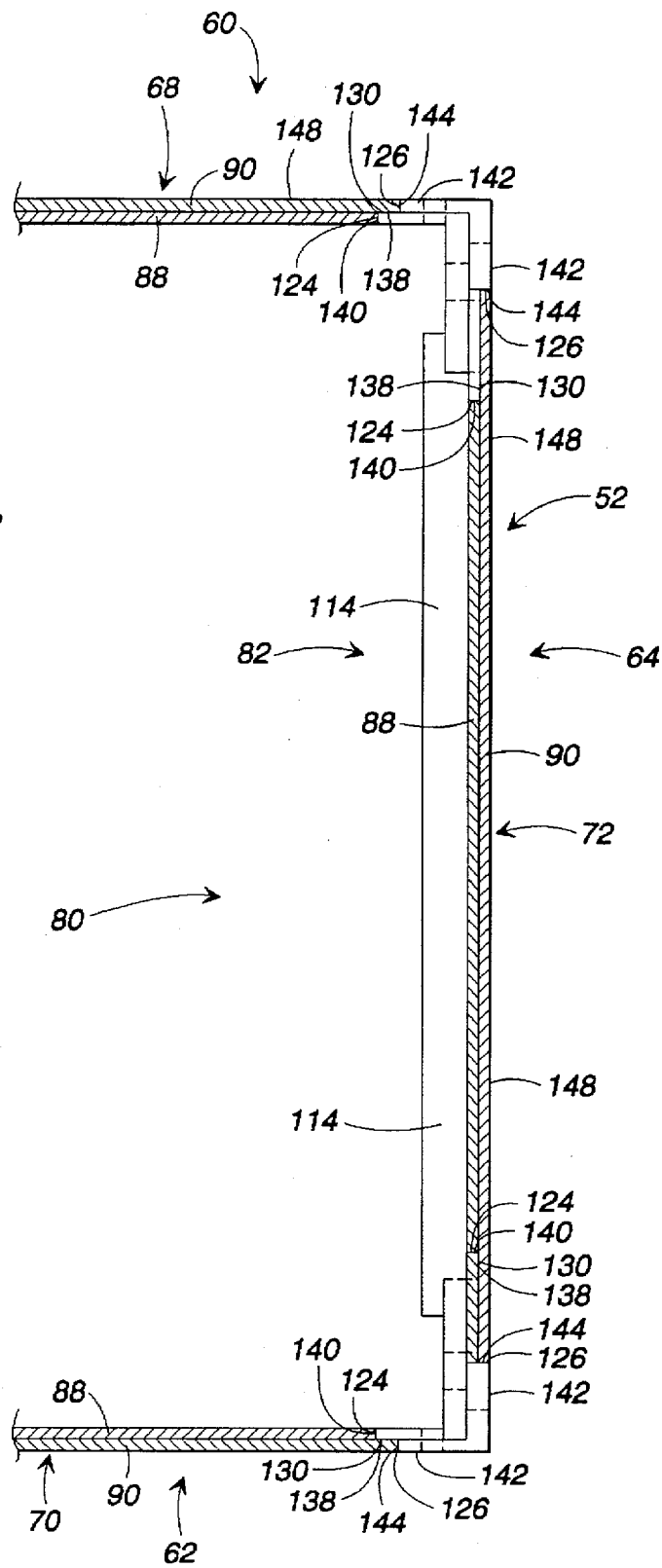
FIG. 16 is partial sectional view of the outer sleeve of the multi-media storage container taken along line 16—16 of FIG. 1.
Figure 27:
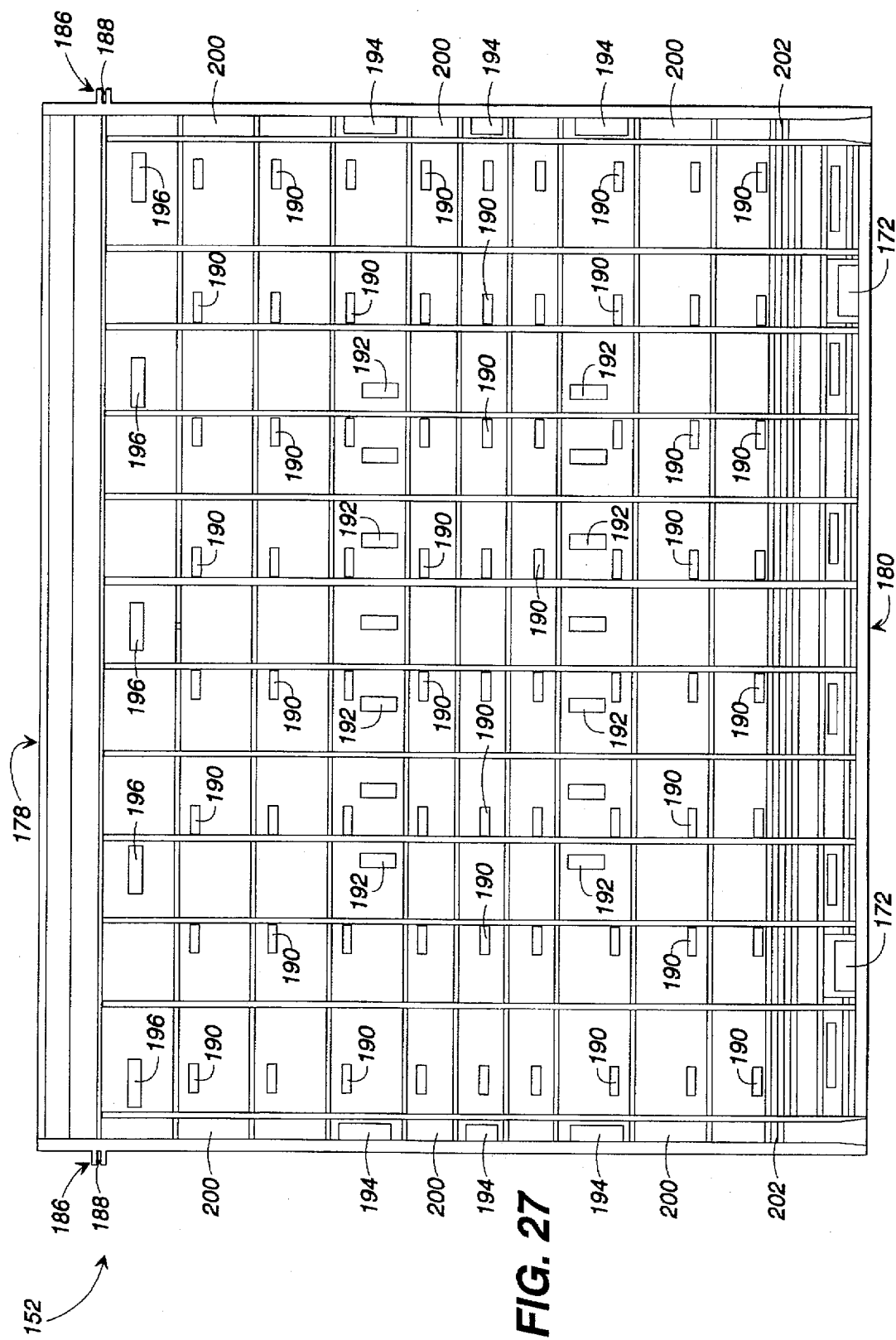
FIG. 27 is a bottom view of the base of FIG. 23.
Figure 30:
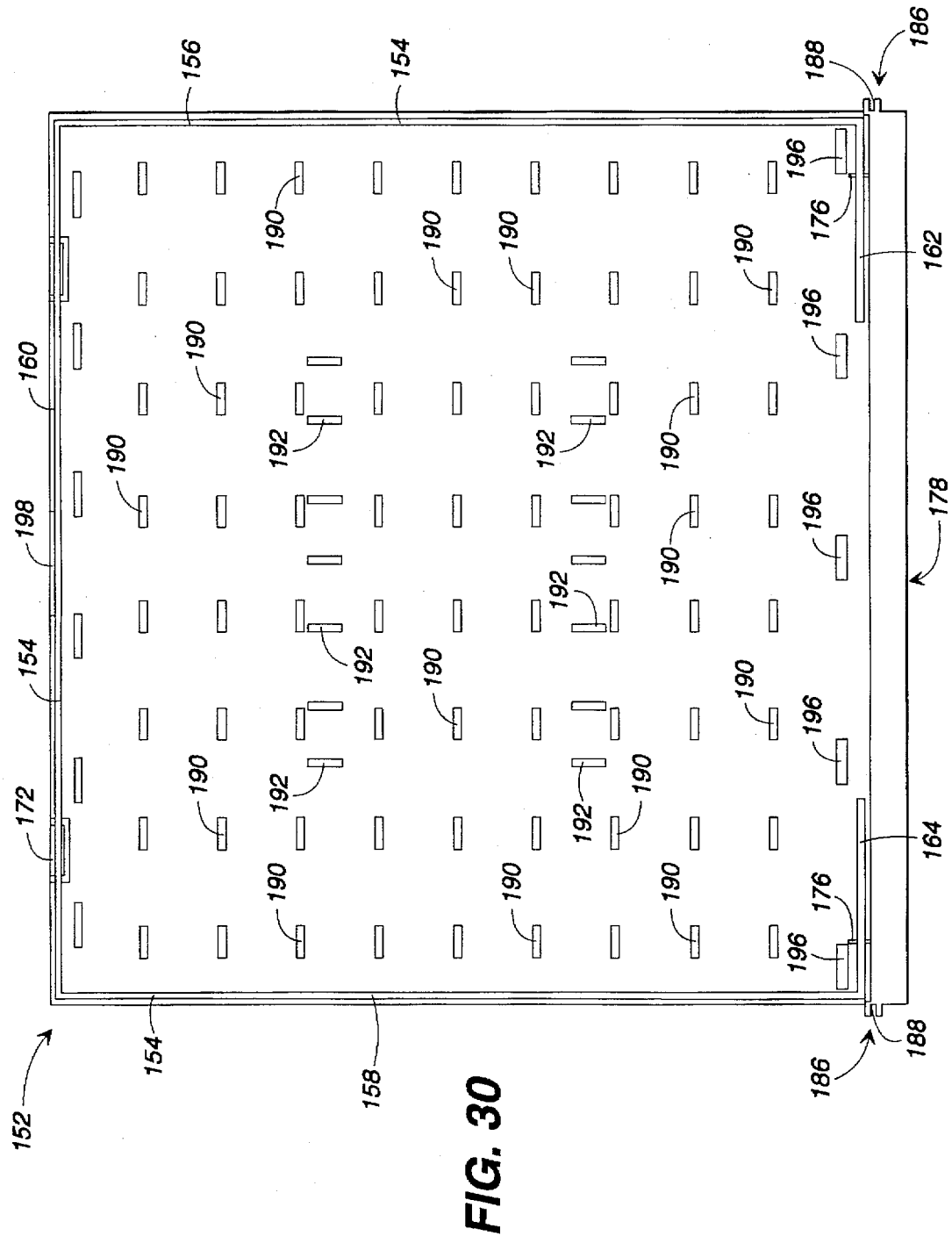
FIG. 30 is a top view of the partially assembled insert assembly of FIG. 28.
Figure 31:
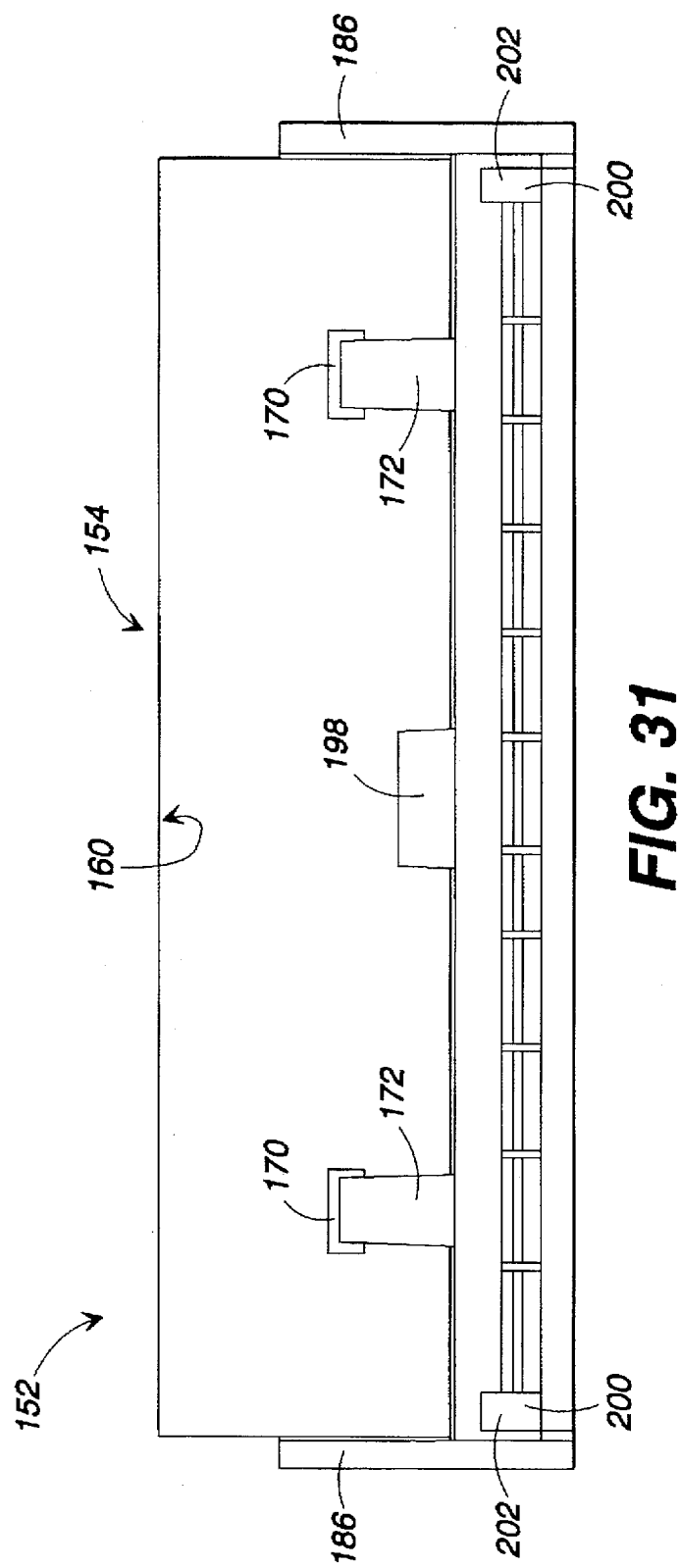
FIG. 31 is a back, elevational view of the partially assembled insert assembly of FIG. 28.

The interaction between a column support 82 and an aperature 84 is illustrated by the side sectional view of FIG. 16. Note that the interaction of all column supports 82 and aperatures 84 is substantially similar and, therefore, need only be discussed for one column support 82. FIG. 16 displays columnar support 82c, located near the front 56 of the cavity 80, mating with the right side panel 72. The interior mating face 138 contacts and rests adjacent to the aperature face 130, while the interior mating shoulder 140 abuts the interior aperature edge 124. The exterior mating face 142 extends through the exterior aperature 122 to fit flush with the exterior surface 148 of the exterior ply 90 of corrugated cardboard, while the exterior mating shoulder 144 abuts the exterior, aperature edge 126. The web portion 114 resides adjacent the interior ply 88 of the outer sleeve 52 and is exposed to the cavity 80.

Referring now to FIGS. 17 and 18, the insert assembly 54 of the present, invention comprises a base portion 150 and the face plate 78 seen in FIG. 1. The base portion 150 includes a base 152 and a wall subassembly 154 which work in conjunction to define a media reservoir 155 for receipt of various forms of media. As shown in FIGS. 19–22, the wall subassembly 154 is, preferably, manufactured from a single piece of single ply corrugated cardboard which is folded over and glued to yield a wall subassembly 154 having, essentially, two-plies. The wall subassembly 154 has a right side panel 156, a left side panel 158 (which is a mirror image of the right side panel 156), a back panel 160, and two front panels 162,164. The right side panel 156 extends between front panel 162 and back panel 160, while the left side panel 158 extends between front panel 164 and back panel 160. The right and left side panels include tabs 166 for connection to the base 152. The back panel 160 includes a plurality of vertical slots 168 for receipt of the tabs of media dividers (not shown) which, when installed, divide the media reservoir 155 into separate portions. The vertical slots 168 extend through only one ply of the back panel 160. The back panel 160 also has a pair of openings 170 which extend through both plies of the back panel 160 for receipt of retaining hooks 172 as shown in FIG. 18. Each front panel 162,164 includes a slit 174 which extends through the front panels 162,164 and receives a rib 176 protruding from the base 152.

The base 152 is, preferably, manufactured of injection-molded plastic and, as seen in FIGS. 23–27, has a front portion 178 which interacts with the face plate 78 (see FIG. 18) and a rear portion 180 which receives the wall subassembly 154. The front portion 178 has a wall 182 which defines a recess 184 that extends across the front of the base 152 as seen in FIG. 24. The front portion 178 also includes a pair of channels 186 which define gaps 188 for receipt of the face plate 78. As seen in the back view of FIG. 26, the front portion 178 further includes a plurality of ribs 176. The rear portion 180, as shown in FIG. 25, includes a first plurality of slots 190 arranged in a grid for receipt of the tabs extending from the bottom of media supports (not shown). A second plurality of slots 192 is linearly arranged to receive the tabs of media dividers (not shown). Additionally, the rear portion 180 includes a third plurality of slots 194 for receipt of tabs 166 of the wall subassembly 154. A fourth plurality of slots 196 is located near the front portion 178, each receiving a finger 197 which extends from the face plate 78. The rear portion 180 also has a stop 198 against which the wall subassembly 154 rests, thereby limiting rearward movement of the wall subassembly 154. As seen in the back and bottom views of FIGS. 26 and 27, respectively, the rear portion 180 defines runners 200 which receive stops 100 of tracks 86. Runner stops 202 limit forward movement of the insert assembly 54. FIGS. 28–31 display the wall subassembly 154 after attachment to the base 152.

Figure 32:
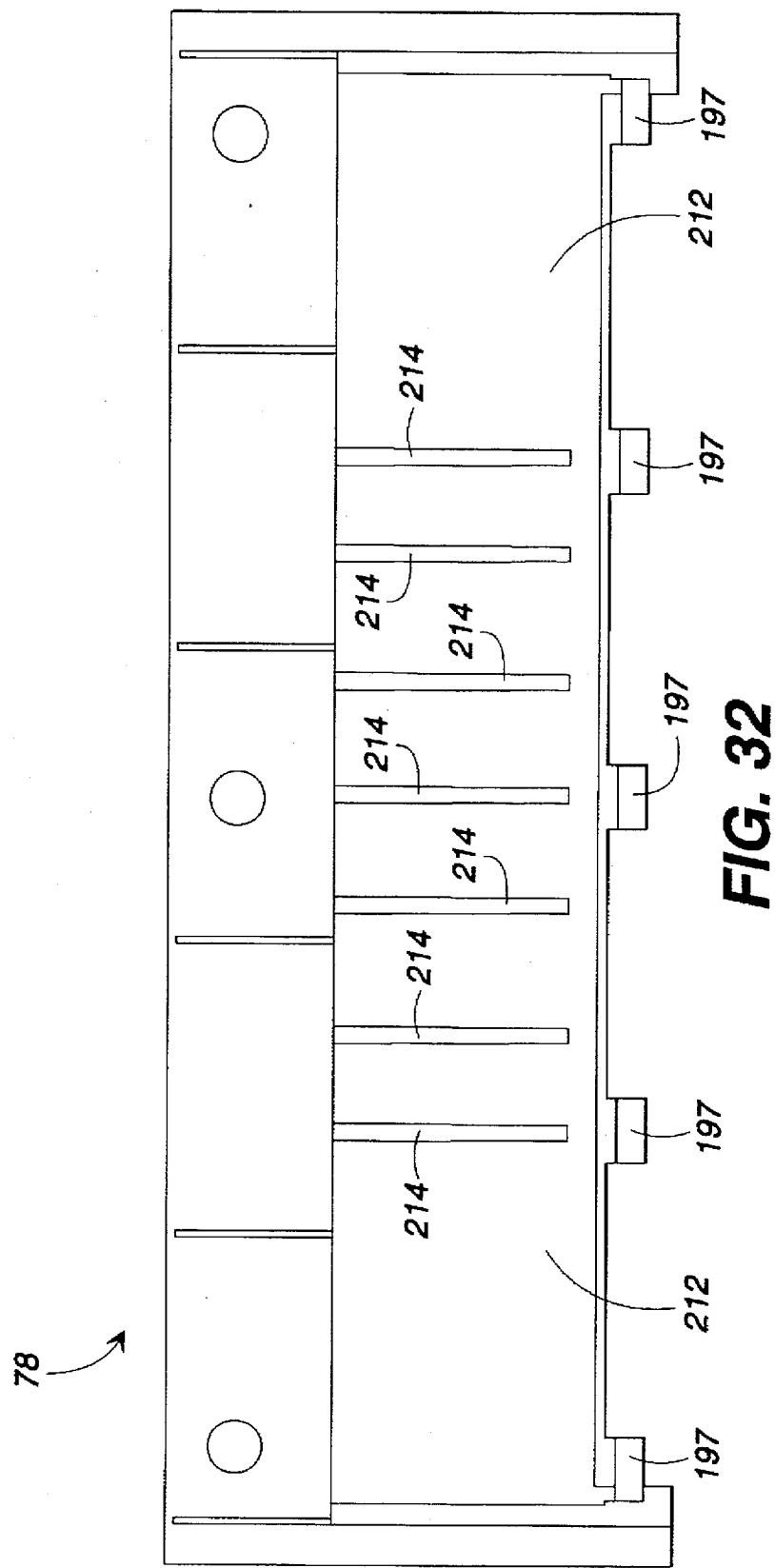
FIG. 32 is a back, elevational view of a face plate in accordance with the preferred embodiment of the present invention.

The face plate 78 of the present invention is displayed in FIGS. 17, 18 and 32. As seen in FIG. 18, the face plate 78 has a front 204 and a back 206. The face plate 78 has a wall 208 which defines a cavity 210 for receipt of the front portion 178 of the base 152. When assembled as shown in FIG. 18; the wall 208 of the face plate 78 resides within the gaps 188 defined by the channels 186 on each side of the base 152. The face plate 78 also includes an interface portion 212 which extends from the back 206 and over the front panels 162,164 of the wall subsystem 154, thereby securing the front panels 162,164. A plurality of fingers 197 extend downward from the interface portion 212 and into slots 196 of the base 150. The presence of the fingers 197 in the slots 196 causes the interface portion 212 to press against the front panels 162,164 of the wall subsystem 154 and further secure the front panels 162,164. The interface portion 212 also includes a plurality of slots 214 to receive the tabs of media dividers (not shown). As shown in FIG. 17, the front 204 of the face plate has a keyway 216 for a lock mechanism and a recess 218 for an identification label.

Figure 33:
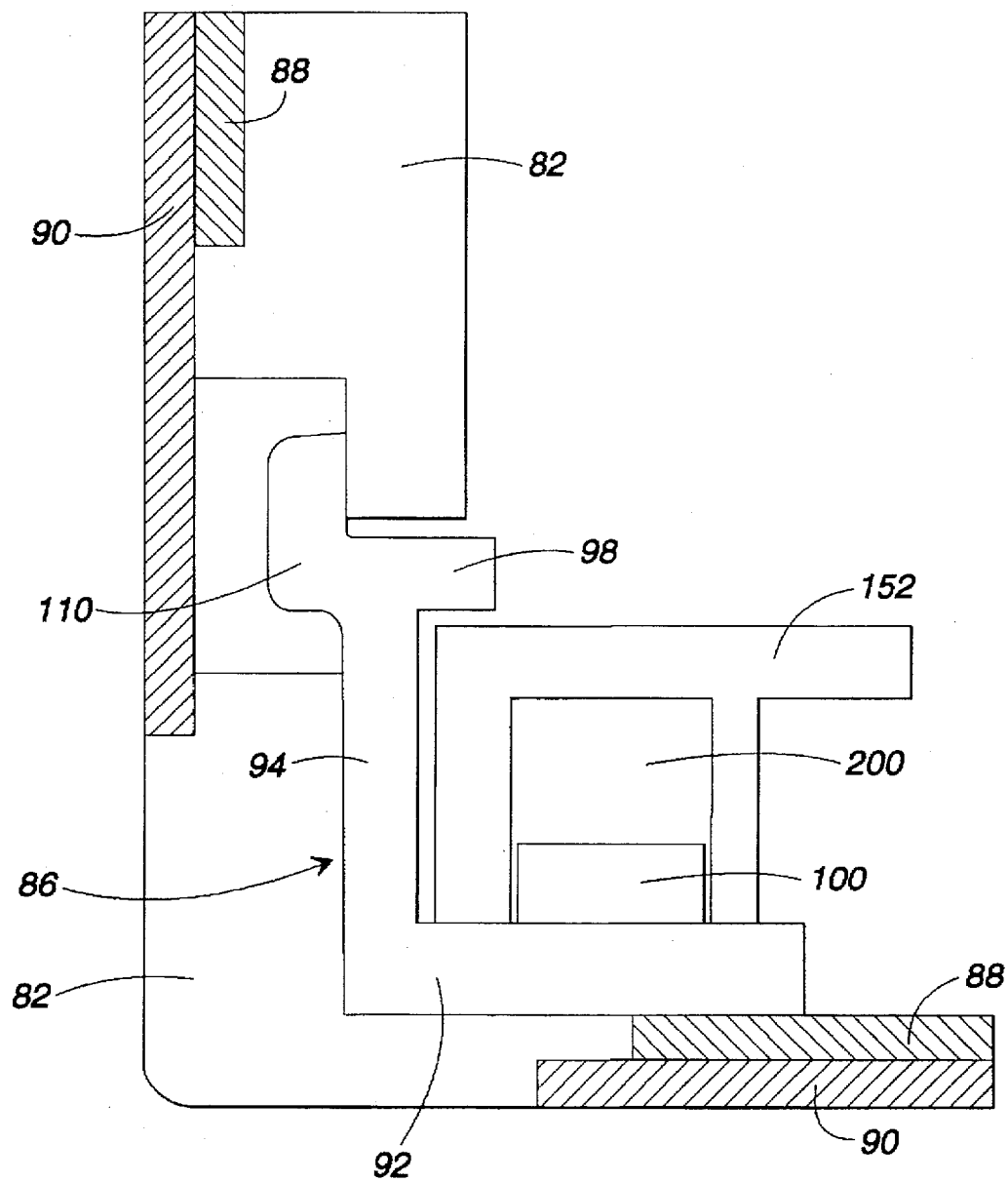
FIG. 33 is a schematic representation displaying the interrelationship between a columnar support, a track, and a base of an insert assembly in accordance with a preferred embodiment of the present invention.
Figure 34:
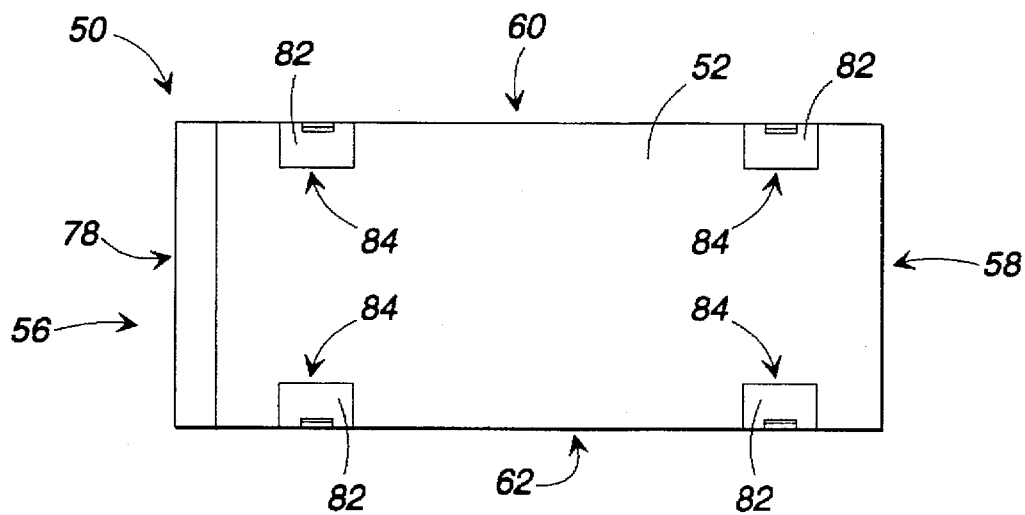
FIG. 34 is a right side, elevational view of the multi-media storage container of FIG. 1.
Figure 35:
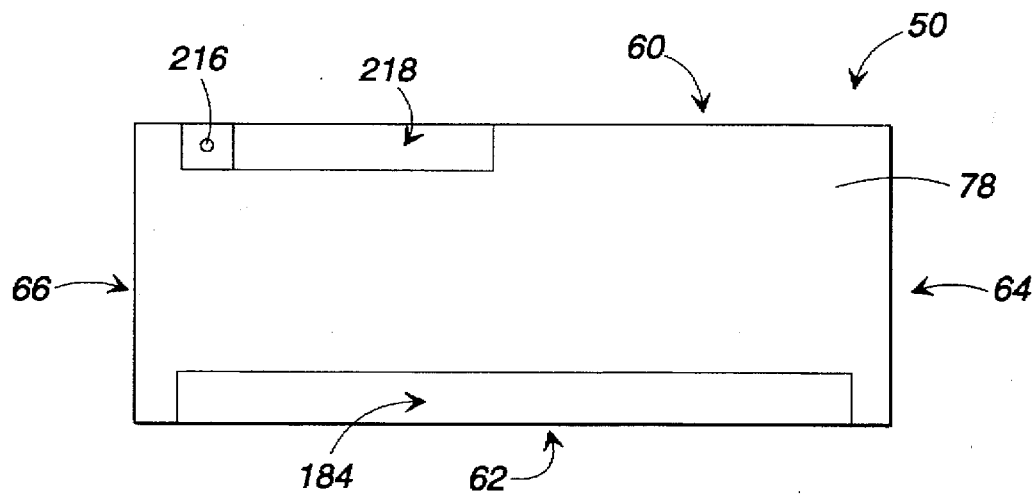
FIG. 35 is a front, elevational view of the multi-media storage container of FIG. 1.

In accordance with a preferred method of the present invention, the multi-media storage container 50 is assembled by positioning the back panel 160 of the wall subsystem 154 so that retaining hooks 172 extend through openings 170. Then, tabs 166 are located within slots 194 of the base plate 152 and slits 174 are pressed down over ribs 176. Next, the face plate 78 is placed over top of the front portion 178 of the base 152 so that the front portion 178 resides within the cavity 210 and walls 208 reside within the gaps 188 of the channels 186. The fingers 197 are located in slots 196 to complete assembly of the insert assembly 54. In accordance with the preferred method and as shown in the schematic representation of FIG. 33, the insert assembly 54 is inserted into cavity 80 of the outer sleeve 52 so that the stops 100 on the tracks 86, nearest the front 56 of the multi-media storage container 50, reside within the runners 200 of the base 152. Upon pushing the insert assembly 54 completely into the cavity 80, the multi-media storage container 50 appears as shown in the different views of FIG. 1 and FIGS. 34-38.

Figure 39:
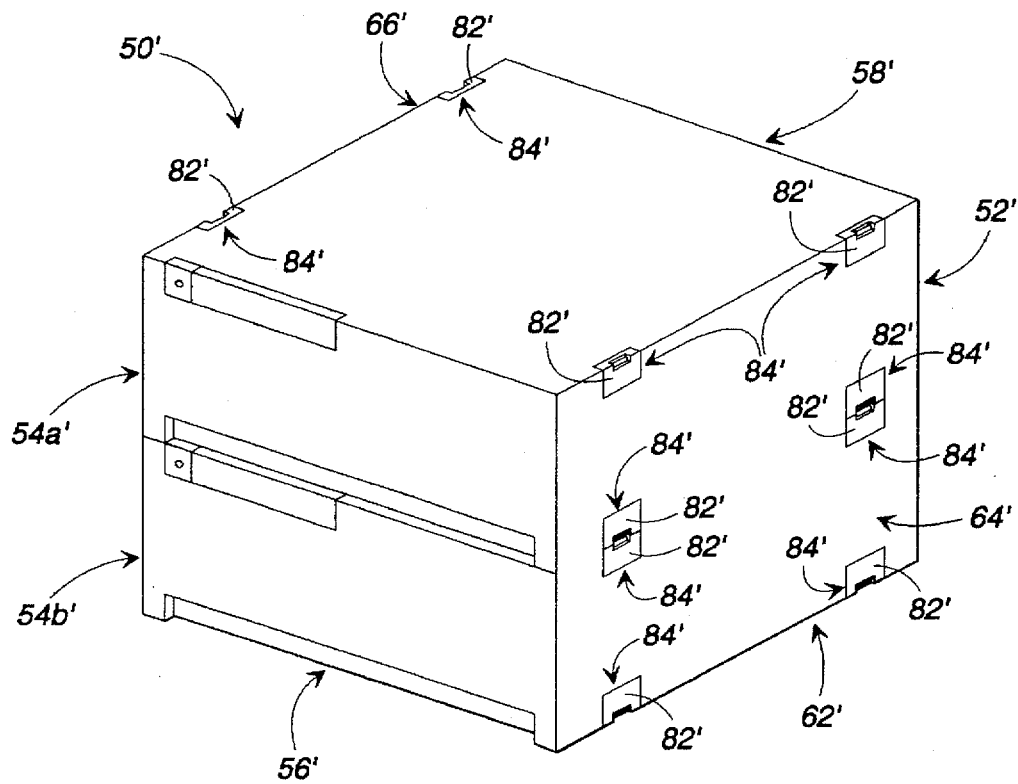
FIG. 39 is a side, perspective view of a multi-media storage container in accordance with an alternate embodiment of the present invention.
Figure 40:
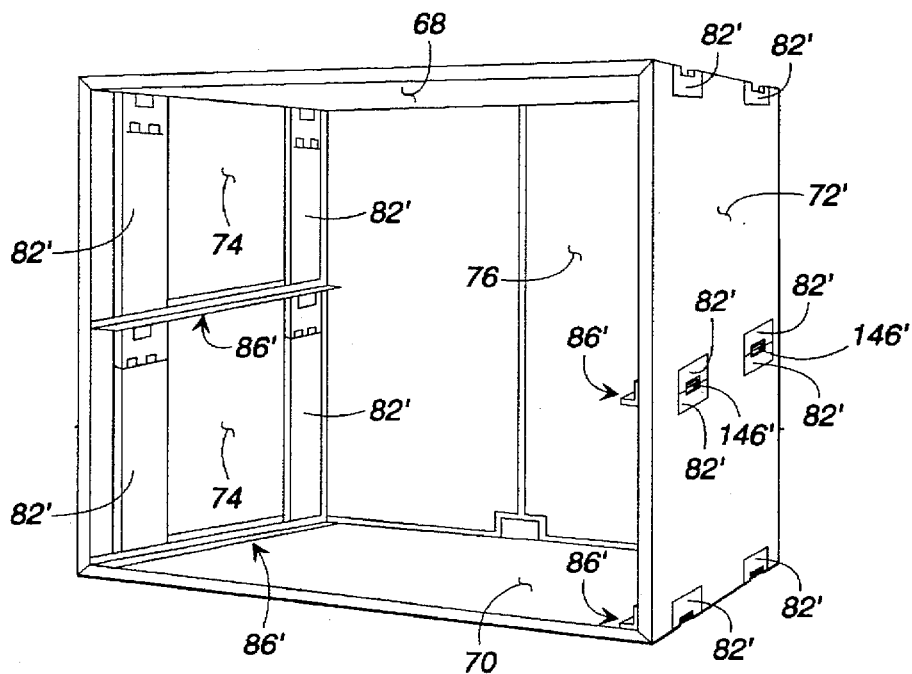
FIG. 40 is a side, perspective view of the outer sleeve of the multi-media storage container of FIG. 39.

FIGS. 39 and 40 display a multi-media storage container 50' in accordance with an alternate embodiment of the present invention. The multi-media storage container 50' includes an outer shell 52' and two insert assemblies 54a', 54b' which reside within cavity 80'. Note that the scope of the present invention is understood to encompass multi-media storage containers having more than two insert assemblies. As seen in FIG. 40, a plurality of columnar supports 82' and tracks 86' are mounted within the cavity 80' in substantially the same manner as in the preferred embodiment with the addition of a clip (not shown) positioned in the clip receptacles 146 of the columnar supports 82' to join vertically-aligned columnar supports 82' together.

Attention is now directed to the specification and claims of U.S. patent application Ser. No. 08/349,895, filed Dec. 6, 1994, which are hereby incorporated by reference.

Whereas this invention has been described in detail with particular reference its most preferred embodiment, it will be understood that variations and modifications can be effected within the spirit and scope of the invention, as described herein before and as defined in the appended claims.

We claim:

1. A storage container, comprising:
    an outer sleeve defining a cavity, said outer sleeve including
        a top panel,
        a bottom panel, and
        a side panel joining said top and bottom panels, said side panel and said top panel defining a first edge therebetween, said side panel and said bottom panel defining a second edge therebetween,
    wherein said top panel and said side panel define a first aperture which extends through said first edge within said top and side panels,
    wherein said bottom panel and said side panel define a second aperture which extends through said second edge within said bottom and side panels, said first aperture opposing said second aperture;
    a columnar support adjacent said side panel, said columnar support extending into said first aperture and extending into said second aperture;
    a track adjacent to said side panel and coupled to said columnar support; and
    an insert assembly removably inserted into said cavity of said outer sleeve, said insert assembly resting on said track and defining a reservoir in said cavity.

2. The storage container of claim 1, wherein said columnar support resides within said cavity and is accessible from outside of said outer sleeve.

3. The storage container of claim 1, wherein said columnar support has a portion which extends beneath said track.

4. The storage container of claim 1, wherein:
    said top panel and said side panel define a third aperture which extends through said first edge within said top and side panels, said third aperture being disposed along said first edge distant from said first aperture,
    said bottom panel and said side panel define a fourth aperture which extends through said second edge within said bottom and side panels, said fourth aperture being disposed along said second edge distant from said second aperture and opposite said third aperture,
    said columnar support is a first columnar support and said storage container further includes a second columnar support adjacent said side panel and disposed distant from said first columnar support,
    said second columnar support extends into said third aperture,
    said second columnar support extends into said fourth aperture, and
    said track couples to said second columnar support.

5. The storage container of claim 4, wherein said track has a portion adjacent said side panel and extending between said first and second columnar supports.

6. The storage container of claim 5 wherein,
    said portion is a first portion, and
    said track has a second portion connected to said first columnar support.

7. The storage container of claim 1 wherein,
    said track has a portion extending into said cavity in a direction away from said side panel,
    said track has a protrusion extending into said cavity in a direction away from said side panel and above said portion of said track, and
    said insert assembly is slideably received between said portion of said track and said protrusion.

8. The storage container of claim 7 wherein,
    said protrusion is a first protrusion,
    said track includes a second protrusion extending into said cavity, and
    said insert assembly is slideably received between said first protrusion and said second protrusion.

9. The storage container of claim 8 wherein,
    said insert assembly defines a channel, and
    said second protrusion resides within said channel.

\* \* \* \* \*